US011956335B1

(12) United States Patent
Goela et al.

(10) Patent No.: US 11,956,335 B1
(45) Date of Patent: *Apr. 9, 2024

(54) AUTOMATED MAPPING OF MULTI-TIER APPLICATIONS IN A DISTRIBUTED SYSTEM

(71) Applicant: Tanium Inc., Kirkland, WA (US)

(72) Inventors: Naveen Goela, Berkeley, CA (US); Rishi Kant, Foster City, CA (US); Andrew R. White, Apex, NC (US); Christian L. Hunt, Chapel Hill, NC (US); David Irwin, Cary, NC (US)

(73) Assignee: Tanium Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,504

(22) Filed: May 23, 2022

Related U.S. Application Data

(63) Continuation of application No. 16/943,291, filed on Jul. 30, 2020, now Pat. No. 11,343,355, which is a (Continued)

(51) Int. Cl.
*H04L 67/75* (2022.01)
*G06F 16/2458* (2019.01)
(Continued)

(52) U.S. Cl.
CPC .......... *H04L 67/75* (2022.05); *G06F 16/2477* (2019.01); *H04L 41/12* (2013.01); *H04L 67/10* (2013.01)

(58) Field of Classification Search
CPC ......... H04L 67/10; H04L 67/36; H04L 41/12; H04L 61/2007; G06F 16/2477
(Continued)

(56) References Cited

U.S. PATENT DOCUMENTS 5,220,596 A * 6/1993 Patel ................. H04M 3/53325
 379/88.27
5,842,202 A * 11/1998 Kon .................... G06F 11/0727
(Continued)

FOREIGN PATENT DOCUMENTS

EP 1553747 A1 7/2005
EP 2493118 A1 8/2012

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pp. 133-142.*
(Continued)

*Primary Examiner* — Tauqir Hussain
(74) *Attorney, Agent, or Firm* — Nicholson De Vos Webster & Elliott LLP

(57) ABSTRACT

An application mapping procedure obtains and aggregates application mapping information from a plurality of machines in a distributed system. An application dependency map, including first layer of application mapping information, is initialized, and then a first query is sent to one or more of the machines. In response, information identifying entities that have participated in predefined communications with entities identified in an existing layer of application mapping information in the application dependency map are received, and a second layer of application mapping information is added to the application dependency map, based at least in part on the information received in response to the first query. After adding the second layer of application mapping information to the application dependency map, a second query is sent to one or more of the endpoint machines, the second query being based at least in part on the application dependency map.

26 Claims, 13 Drawing Sheets

Related U.S. Application Data continuation-in-part of application No. 16/430,336, filed on Jun. 3, 2019, now Pat. No. 10,841,365.

(60) Provisional application No. 62/881,896, filed on Aug. 1, 2019, provisional application No. 62/700,171, filed on Jul. 18, 2018.

(51) Int. Cl.
*H04L 41/12* (2022.01)
*H04L 67/10* (2022.01)

(58) Field of Classification Search
USPC .................................................... 709/223
See application file for complete search history.

(56) References Cited

U.S. PATENT DOCUMENTS

| | | | |
|---|---|---|---|
| 5,949,755 A | 9/1999 | Uphadya et al. | |
| 6,049,828 A | 4/2000 | Dev et al. | |
| 6,615,213 B1 | 9/2003 | Johnson | |
| 6,879,979 B2 | 4/2005 | Hindawi et al. | |
| 6,885,644 B1 | 4/2005 | Knop et al. | |
| 6,959,000 B1 | 10/2005 | Lee et al. | |
| 7,043,550 B2 | 5/2006 | Knop et al. | |
| 7,120,693 B2 | 10/2006 | Chang et al. | |
| 7,225,243 B1 | 5/2007 | Wilson | |
| 7,240,044 B2* | 7/2007 | Chaudhuri | G06F 16/24545 |
| 7,299,047 B2 | 11/2007 | Dolan et al. | |
| 7,555,545 B2 | 6/2009 | McCasland | |
| 7,600,018 B2 | 10/2009 | Maekawa et al. | |
| 7,698,453 B2 | 4/2010 | Samuels et al. | |
| 7,720,641 B2 | 5/2010 | Alagappan et al. | |
| 7,761,557 B2 | 7/2010 | Fellenstein et al. | |
| 7,769,848 B2 | 8/2010 | Choy et al. | |
| 7,844,687 B1 | 11/2010 | Gelvin et al. | |
| 8,078,668 B2 | 12/2011 | Moreau | |
| 8,086,729 B1 | 12/2011 | Hindawi et al. | |
| 8,139,508 B1* | 3/2012 | Roskind | H04L 67/1065 370/255 |
| 8,185,612 B1 | 5/2012 | Arolovitch et al. | |
| 8,185,615 B1 | 5/2012 | McDysan et al. | |
| 8,271,522 B2 | 9/2012 | Mehul et al. | |
| 8,392,530 B1 | 3/2013 | Manapragada et al. | |
| 8,477,660 B2 | 7/2013 | Lee et al. | |
| 8,504,879 B2 | 8/2013 | Poletto et al. | |
| 8,510,562 B2 | 8/2013 | Ramakrishnan et al. | |
| 8,650,160 B1* | 2/2014 | Beatty | G06F 11/1469 707/674 |
| 8,813,228 B2* | 8/2014 | Magee | H04L 63/20 726/24 |
| 8,885,521 B2 | 11/2014 | Wang et al. | |
| 8,903,973 B1 | 12/2014 | Hindawi et al. | |
| 8,904,039 B1* | 12/2014 | Hindawi | H04L 12/6418 709/243 |
| 9,009,827 B1* | 4/2015 | Albertson | H04L 63/14 726/22 |
| 9,059,961 B2 | 6/2015 | Hindawi et al. | |
| 9,104,794 B2* | 8/2015 | Zakonov | G06F 11/3604 |
| 9,246,977 B2 | 1/2016 | Hindawi et al. | |
| 9,609,007 B1* | 3/2017 | Rivlin | H04L 51/12 |
| 9,667,738 B2 | 5/2017 | Hindawi et al. | |
| 9,716,649 B2 | 7/2017 | Bent et al. | |
| 9,769,037 B2 | 9/2017 | Hindawi et al. | |
| 9,800,603 B1 | 10/2017 | Sidagni et al. | |
| 9,985,982 B1* | 5/2018 | Bartos | G06F 21/566 |
| 9,998,955 B1* | 6/2018 | MacCarthaigh | H04L 65/611 |
| 10,095,864 B2 | 10/2018 | Hunt et al. | |
| 10,136,415 B2 | 11/2018 | Hindawi et al. | |
| 10,261,770 B2 | 4/2019 | Devagupthapu et al. | |
| 10,482,242 B2* | 11/2019 | Hunt | H04L 67/141 |
| 10,498,744 B2 | 12/2019 | Hunt et al. | |
| 10,795,906 B1 | 10/2020 | Teubner | |
| 10,824,729 B2 | 11/2020 | Hoscheit et al. | |
| 10,929,345 B2 | 2/2021 | Stoddard et al. | |
| 11,100,199 B2* | 8/2021 | Subramaniam | H04L 63/102 |
| 11,153,383 B2 | 10/2021 | Richards et al. | |
| 11,343,355 B1* | 5/2022 | Goela | H04L 41/5058 |
| 2001/0056461 A1 | 12/2001 | Kampe et al. | |
| 2002/0007404 A1* | 1/2002 | Vange | H04L 67/1034 709/217 |
| 2002/0042693 A1 | 4/2002 | Kampe et al. | |
| 2002/0073086 A1 | 6/2002 | Thompson et al. | |
| 2002/0198867 A1* | 12/2002 | Lohman | G06F 16/24549 |
| 2003/0101253 A1 | 5/2003 | Saito et al. | |
| 2003/0131044 A1 | 7/2003 | Nagendra et al. | |
| 2003/0212676 A1 | 11/2003 | Bruce et al. | |
| 2003/0212821 A1* | 11/2003 | Gillies | H04L 45/02 709/238 |
| 2004/0076164 A1 | 4/2004 | Vanderveen et al. | |
| 2004/0190085 A1 | 9/2004 | Silverbrook et al. | |
| 2005/0004907 A1* | 1/2005 | Bruno | G06F 16/2462 |
| 2005/0108356 A1 | 5/2005 | Rosu et al. | |
| 2005/0108389 A1 | 5/2005 | Kempin et al. | |
| 2005/0195755 A1 | 9/2005 | Senta et al. | |
| 2006/0039371 A1 | 2/2006 | Castro et al. | |
| 2006/0128406 A1* | 6/2006 | Macartney | H04W 12/1208 455/466 |
| 2007/0005738 A1 | 1/2007 | Alexion-Tiernan et al. | |
| 2007/0171844 A1 | 7/2007 | Loyd et al. | |
| 2007/0211651 A1 | 9/2007 | Ahmed et al. | |
| 2007/0230482 A1* | 10/2007 | Shim | H04L 45/02 370/400 |
| 2008/0082628 A1 | 4/2008 | Rowstron et al. | |
| 2008/0133582 A1 | 6/2008 | Andersch et al. | |
| 2008/0258880 A1* | 10/2008 | Smith | H04L 67/125 340/286.02 |
| 2008/0263031 A1 | 10/2008 | George et al. | |
| 2008/0288646 A1 | 11/2008 | Hasha et al. | |
| 2009/0125639 A1 | 5/2009 | Dam et al. | |
| 2009/0271360 A1* | 10/2009 | Bestgen | G06F 16/24542 |
| 2009/0285204 A1 | 11/2009 | Gallant et al. | |
| 2009/0319503 A1 | 12/2009 | Mehul et al. | |
| 2009/0328115 A1* | 12/2009 | Malik | H04N 21/2393 725/93 |
| 2010/0070570 A1* | 3/2010 | Lepeska | H04L 67/2857 709/203 |
| 2010/0085948 A1 | 4/2010 | Yu et al. | |
| 2010/0094862 A1* | 4/2010 | Bent | G06F 16/2471 707/716 |
| 2010/0296416 A1* | 11/2010 | Lee | H04L 12/4637 370/258 |
| 2010/0306252 A1* | 12/2010 | Jarvis | H04L 67/1097 707/822 |
| 2011/0099562 A1* | 4/2011 | Nandy | G06F 30/34 719/320 |
| 2011/0231431 A1 | 9/2011 | Kamiwada et al. | |
| 2011/0271319 A1* | 11/2011 | Venable, Sr. | H04L 41/12 709/224 |
| 2012/0110183 A1 | 5/2012 | Miranda et al. | |
| 2012/0269096 A1* | 10/2012 | Roskind | H04L 43/10 370/255 |
| 2012/0330700 A1* | 12/2012 | Garg | G06Q 10/00 705/7.11 |
| 2013/0110931 A1 | 5/2013 | Kim et al. | |
| 2013/0170336 A1 | 7/2013 | Chen et al. | |
| 2013/0276053 A1 | 10/2013 | Hugard, IV et al. | |
| 2014/0075505 A1* | 3/2014 | Subramanian | H04L 63/18 726/3 |
| 2014/0101133 A1* | 4/2014 | Carston | G06F 16/24545 707/718 |
| 2014/0149557 A1 | 5/2014 | Lohmar et al. | |
| 2014/0164552 A1* | 6/2014 | Kim | H04L 67/2842 709/214 |
| 2014/0181247 A1 | 6/2014 | Hindawi et al. | |
| 2014/0244727 A1 | 8/2014 | Kang et al. | |
| 2014/0280280 A1* | 9/2014 | Singh | G06F 16/24545 707/759 |
| 2014/0372533 A1* | 12/2014 | Fu | G06F 9/5072 709/204 |
| 2014/0375528 A1 | 12/2014 | Ling | |

(56) References Cited

U.S. PATENT DOCUMENTS

| | | | |
|---|---|---|---|
| 2015/0080039 A1 | 3/2015 | Ling et al. | |
| 2015/0149624 A1* | 5/2015 | Hindawi | H04L 12/4641 709/224 |
| 2015/0163121 A1* | 6/2015 | Mahaffey | H04L 63/1425 707/687 |
| 2015/0172228 A1 | 6/2015 | Zalepa et al. | |
| 2015/0256575 A1* | 9/2015 | Scott | G06Q 20/145 705/40 |
| 2015/0372911 A1 | 12/2015 | Yabusaki et al. | |
| 2015/0373043 A1* | 12/2015 | Wang | G06F 21/552 706/12 |
| 2015/0378743 A1* | 12/2015 | Zellermayer | G06F 9/45558 713/2 |
| 2016/0080408 A1* | 3/2016 | Coleman | G06F 21/577 726/22 |
| 2016/0119251 A1 | 4/2016 | Solis et al. | |
| 2016/0269434 A1* | 9/2016 | DiValentin | H04L 63/1408 |
| 2016/0286540 A1 | 9/2016 | Hindawi et al. | |
| 2016/0352588 A1 | 12/2016 | Subbarayan et al. | |
| 2016/0360006 A1* | 12/2016 | Hopkins | H04L 67/34 |
| 2016/0378450 A1* | 12/2016 | Fu | G06F 8/60 717/177 |
| 2017/0118074 A1 | 4/2017 | Feinstein et al. | |
| 2017/0257432 A1* | 9/2017 | Fu | H04L 67/1014 |
| 2018/0013768 A1 | 1/2018 | Hunt et al. | |
| 2018/0039486 A1 | 2/2018 | Kulkami et al. | |
| 2018/0074796 A1 | 3/2018 | Alabes et al. | |
| 2018/0191747 A1* | 7/2018 | Nachenberg | H04L 63/20 |
| 2018/0267794 A1 | 9/2018 | Atchison et al. | |
| 2018/0351792 A1 | 12/2018 | Hunter et al. | |
| 2018/0351793 A1 | 12/2018 | Hunter et al. | |
| 2020/0028890 A1 | 1/2020 | White et al. | |
| 2020/0053072 A1* | 2/2020 | Glozman | H04W 12/06 |
| 2020/0198867 A1 | 6/2020 | Nakamichi | |

OTHER PUBLICATIONS

Hood, Proactive Network-Fault Detection, Sep. 1997, 9 pages.
Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.
Weixiong Rao et al., "Optimal Resource Placement in Structured Peer-to-Peer Networks," Jul. 2010, IEEE Transactions on Parallel and Distributed Systems, vol. 21, No. 7, 16 pgs.
Tanium Inc., International Search Report and Written Opinion, PCT/US2013/076971, dated Apr. 4, 2014, 17 pgs.
Tanium Inc., International Preliminary Report on Patentability, PCT/US2013/076971, dated Jun. 23, 2015, 14 pgs.
Tanium Inc., International Search Report and Written Opinion, PCT/US2014/067607, dated Feb. 18, 2015, 15 pgs.
Tanium Inc., International Preliminary Report on Patentability, PCT/US2014/067607, dated May 31, 2016, 10 pgs.
Tanium Inc., International Search Report and Written Opinion, PCT/US2015/020780, dated Jul. 2, 2015, 13 pgs.
Tanium Inc., International Preliminary Report on Patentability, PCT/US2015/020780, dated Sep. 27, 2016, 9 pgs.
Hindawi, Office Action, U.S. Appl. No. 15/702,617, dated Jun. 1, 2018, 37 pgs.
Hindawi, Final Office Action, U.S. Appl. No. 15/702,617, dated Dec. 27, 2018, 54 pgs.
Hunt, Office Action dated Oct. 4, 2018, U.S. Appl. No. 15/215,468, 13 pgs.
Hunt, Notice of Allowance dated Jan. 24, 2019, U.S. Appl. No. 15/215,468, 8 pgs.
Hunt, Notice of Allowance dated Apr. 1, 2019, U.S. Appl. No. 15/215,468, 8 pgs.
Hunt, Office Action dated Sep. 10, 2018, U.S. Appl. No. 15/215,474, 10 pgs.
Hunt, Final Office Action dated Apr. 1, 2019, U.S. Appl. No. 15/215,474, 7 pgs.
Hunt, Notice of Allowance, U.S. Appl. No. 15/713,518, dated Apr. 10, 2019, 14 pgs.
Lippincott, Notice of Allowance, U.S. Appl. No. 15/878,286, dated Apr. 25, 2019, 9 pgs.
Jae Woo Lee et al., 0 to 10k in 20 Seconds: Bootstrapping Large-Scale DHT Networks, 2011 IEE International Conference on Communications, Jun. 9, 2011, pp. 1-6.
Stoica, et al., Chord: A Scalable Peer-to-Peer Lookup Service for Internet Applications, 2001, pp. 1-12 (Year: 2002).
Ping Wang, Baber Aslann, Cliff C. Zou, Peer-to-Peer Botnets: The Next Generation of Botnet Attacks, Jan. 2010, pp. 1-25 (Year: 2010).
Sean Rhea, Dennis Geels, Timothy Roscoe, and John Kubiatowicz, Handling Churn in a DHT, 2004, pp. 1-14 (Year: 2004).
Richards, Non-Final Office Action, U.S. Appl. No. 16/443,720, dated Sep. 4, 2020, 11 pgs.
Richards, Notice of Allowance, U.S. Appl. No. 16/443,720, dated Feb. 9, 2021, 8 pgs.
Richards, Notice of Allowance, U.S. Appl. No. 16/443,720, dated Jun. 15, 2021, 7 pgs.
Goela, Non-Final Office Action, U.S. Appl. No. 16/943,291, dated Jul. 16, 2021, 15 pgs.
Freilich, Non-Final Office Action, U.S. Appl. No. 17/129,638, dated Jul. 23, 2021, 6 pgs.
Richards, Notice of Allowance, U.S. Appl. No. 16/443,720, dated Aug. 4, 2021, 2 pgs.
Goela, Notice of Allowance, U.S. Appl. No. 16/943,291, dated Oct. 1, 2021, 8 pgs.
Hindawi, Non-Final Office Action, U.S. Appl. No. 16/917,800, dated Jul. 1, 2021, 6 pgs.
Hindawi, Notice of Allowance, U.S. Appl. No. 16/917,800, dated Oct. 25, 2021, 2 pgs.
Hindawi, Notice of Allowance, U.S. Appl. No. 16/917,800, dated Oct. 15, 2021, 7 pgs.
Goela, Notice of Allowance, U.S. Appl. No. 16/943,291, dated Oct. 18, 2021, 5 pgs.
Freilich, Notice of Allowance, U.S. Appl. No. 17/129,638, dated Nov. 4, 2021, 8 pgs.
Hindawi, Notice of Allowance, U.S. Appl. No. 16/917,800, dated Nov. 18, 2021, 2 pgs.
Hindawi, Notice of Allowance, U.S. Appl. No. 16/917,800, dated Dec. 16, 2021, 2 pgs.
Stoddard, Non-Final Office Action, U.S. Appl. No. 16/870,742, dated Oct. 28, 2021, 5 pgs.
Goela, Notice of Allowance, U.S. Appl. No. 16/943,291, dated Feb. 25, 2022, 2 pgs.

* cited by examiner

400

402 At a server system, performing an application mapping process that obtains and aggregates application mapping information from the plurality of machines, the application mapping process including:

404 Generating a first layer of application mapping information identifying one or more entities, comprising application entry points, each application entry point comprising information identifying a machine in the plurality of machines, and a process, executed by the identified machine, that is associated with a respective application

406 Initializing an application map with the first layer of application mapping information

408 Performing a plurality of iterations of a predefined map gathering operation, each iteration other than a last iteration of the plurality of iterations adding a layer of application mapping information to the application map, each iteration of the predefined map gathering operation including:

410 Sending one or more queries to, via the one or more linear communication orbits, to machines in the plurality of machines

412 Receiving, via the one or more linear communication orbits, from machines in the plurality of machines, in response to the one or more queries, information identifying entities that have participated in predefined communications with entities identified in a most recently generated or added layer of application mapping information, the predefined communications comprising communications during a predefined or specified time period

414 Conditionally, in accordance with a determination that the received information includes one or more entities not already identified by the application map, adding a layer of application mapping information to the application map based on the received information

416 Wherein the application map maps distributed processing of one or more respective applications, across the plurality of machines in the network; and

418 Providing for presentation to a user, an interactive user interface including at least a portion of the application map and one or more user-selectable further processing options with respect to the application map or a respective machine or process participating in the performance of a respective application mapped by the application map

Figure 4

AUTOMATED MAPPING OF MULTI-TIER APPLICATIONS IN A DISTRIBUTED SYSTEM

RELATED APPLICATIONS

This application is a continuation of Ser. No. 16/943,291, filed Jul. 30, 2020, which claims priority to U.S. Provisional Patent Application No. 62/881,896, filed Aug. 1, 2019, and furthermore was a continuation-in-part of U.S. patent application Ser. No. 16/430,336, filed Jun. 3, 2019, now U.S. Pat. No. 10,841,365, which claims priority to U.S. Provisional Patent Application No. 62/700,171, filed Jul. 18, 2018, each of which is hereby incorporated by reference in its entirety.

This application is also related to U.S. patent application Ser. No. 15/713,518 filed Sep. 22, 2017, now U.S. Pat. No. 10,498,744, titled "Integrity Monitoring in a Local Network"; U.S. patent application Ser. No. 15/215,483, filed July 2016, now U.S. Pat. No. 10,095,864, titled "System and Method for Performing Event Inquiries in a Network," and U.S. patent application Ser. No. 15/215,474, filed Jul. 20, 2016, now U.S. Pat. No. 10,482,242, titled "System and Method for Performing Event Inquiries in a Network," both of which claim the benefit of U.S. Provisional Application Ser. No. 62/333,768, filed May 9, 2016, titled "System and Method for Performing Event Inquiries in a Network"; and U.S. Provisional Patent Application Ser. No. 62/305,482, filed Mar. 8, 2016, titled "Cost Prioritized Evaluations of Indicators of Compromise"; U.S. patent application Ser. No. 13/797,946, filed Mar. 12, 2013, now U.S. Pat. No. 9,246,977, titled "System, Security and Network Management Using Self-Organizing Communication Orbits in Distributed Networks"; U.S. patent application Ser. No. 12/412,623, filed Mar. 27, 2009, now U.S. Pat. No. 8,086,729, titled "Distributed Statistical Detection of Network Problems and Causes"; U.S. patent application Ser. No. 13/084,923, filed Apr. 12, 2011, now U.S. Pat. No. 8,904,039, titled "Large-Scale Network Querying and Reporting"; U.S. patent application Ser. No. 13/107,625, filed May 13, 2011, now U.S. Pat. No. 8,903,973, titled "Parallel Distributed Network Management"; U.S. patent application Ser. No. 14/553,769, filed Nov. 25, 2014, now U.S. Pat. No. 9,769,037, titled "Fast Detection and Remediation of Unmanaged Assets"; U.S. patent application Ser. No. 14/554,739, filed Nov. 26, 2014, now U.S. Pat. No. 9,769,275, titled "Data Caching and Distribution in a Local Network"; and U.S. patent application Ser. No. 15/136,790, filed Apr. 22, 2016, now U.S. Pat. No. 9,910,752, titled "Reliable Map-Reduce Communications in a Decentralized, Self-Organizing Communication Orbit of a Distributed Network." Content of each of the above applications is hereby incorporated by reference in its entirety. The above applications are also referred to hereafter as "the Related Applications" or "the Incorporated Disclosure."

TECHNICAL FIELD

The present disclosure relates to discovering and mapping dependencies between applications and application components in computer networks.

BACKGROUND

Modern Information Technology (IT) infrastructures are complex and dynamic. Establishing and tracking how computer components such as servers, networks, storage, and applications work together to deliver business services (e.g., how those components are interconnected in a given computer network) is a challenge. The process of locating the components of multi-tier applications in a computer network, and identifying their relationships, is sometimes referred to as application dependency mapping or application mapping. Application dependency maps, or application maps, are needed for investigation of and responses to application outages (e.g., discovering what components are expected to be online and running), prevention of application incidents (e.g., accidentally taking a productive component offline), optimization of application infrastructure (e.g., identifying single points of failures, insufficient capacity of nodes in a network, redundancy of running servers, etc.), managing and restricting access to nodes in a computer network, etc.

Conventional approaches to application dependency mapping are manual. Manual mapping is typically performed by application owners and architects, wherein they converse with different component owners and document the relationships discovered using software tools such as Visio (a trademark of Microsoft Inc.). Manual mapping is often prone to errors, performed ad hoc in response to incidents, and is labor-intensive. Such manual maps are often outdated because changes in the computer network occur more frequently than updates of the map. Manual mapping is sometimes combined with mapping that is based on data collected by network-scanning software tools. Those tools typically work by periodically probing a network to establish how nodes in the network are communicating. One drawback of the network-scanning approach is that a significant library of login credentials needs to be maintained, usually by a server, to get access to relevant connection data of each node in the network. Another drawback is that it could place a significant load on the network and negatively impact its performance. For that reason, the network scans are sometimes scheduled for a time period in which low usage of the network is expected. That approach, however, leads to the collection of data that is not representative of the usual traffic in the network. Therefore, conventional approaches create incomplete or inaccurate maps as a result of human errors or lack of access to reliable data, place a resource burden on the network, and/or are labor intensive.

SUMMARY

Accordingly, there is a need within the realm of network mapping techniques, to provide for a mechanism that produces accurate application maps, which identify the components of one or more multi-tier applications, and the dependencies of those components on each other, without unduly burdening the network. Additionally, such a mechanism must generate application maps automatically across a large network (e.g., the network for a large enterprise), in near real-time, without manual requirements that are labor intensive.

Other embodiments and advantages may be apparent to those skilled in the art in light of the descriptions and drawings in this specification.

(A1) A method of mapping applications executed by a plurality of machines in a network, the network including the plurality of machines located at one or more non-static collections of nodes, each non-static collection of nodes forming a linear communication orbit, the network including one or more linear communication orbits. The method includes at a server system, distinct from the plurality of machines, performing an application mapping procedure that obtains and aggregates application mapping information from the plurality of machines. The application mapping procedure includes generating a first layer of application mapping information identifying one or more entities, comprising application entry points, each application entry point comprising a machine in the plurality of machines, and a process, executed by the identified machine, that is associated with a respective application. The application mapping procedure includes initializing an application map with the first layer of application mapping information, and performing a plurality of iterations of a predefined map gathering operation, each iteration of the plurality of iterations adding a layer of application mapping information to the application map, unless the iteration (e.g., a last iteration) gathers no new information to add to the application map. For example, in some embodiments, in the last iteration of the map gathering operation, which identifies processes to add to the application map, the procedure may terminate because either no new information is discovered, or no new communication channels are discovered. In the latter case, in some embodiments, the application mapping procedure detects and avoid cycles/loops in the application map by maintaining a visited list of previously processed components. In situations in which a last iteration of the map gathering operation identifies processes to add to the application map (e.g., in a last layer of the application map), but identifies no new communication channels to add to the application map, a layer of application mapping information is added to the application map, but the application map procedure nevertheless terminates because of the lack of new communication channels to process in a next iteration of the map gathering operation.

Each iteration of the predefined map gathering operation includes sending via the one or more linear communication orbits, one or more queries to machines in the plurality of machines; receiving, via the one or more linear communication orbits, from machines in the plurality of machines, in response to the one or more queries, information identifying entities that have participated in predefined communications with entities identified in a most recently generated or added layer of application mapping information, the predefined communications comprising communications during a predefined or specified time period; and conditionally, in accordance with a determination that the received information includes one or more entities not already identified by the application map, adding a layer of application mapping information to the application map based on the received information. The resulting application map maps distributed processing of one or more respective applications, across the plurality of machines in the network.

The method further includes providing for presentation to a user, an interactive user interface including a representation of at least a portion of the application map. The user interface may include one or more user-selectable processing options with respect to the application map or a respective machine or process participating in the performance of a respective application mapped by the application map.

In some embodiments, the one or more queries are sent, via the one or more linear communication orbits, only to machines, in the plurality of machines, that are application servers.

(A2) In some embodiments of the method of A1, initializing the application map with the first layer of the application mapping information includes generating a list of connections made or received by entities identified by the first layer of application mapping information, and the one or more queries include information identifying the connections in the list of connections to be processed. While performing a respective iteration of the plurality of iterations of the predefined map gathering operation, the information received in response to the one or more queries (while performing a respective iteration) identifies entities having reciprocal connections, reciprocal to the connections identified by the list of connections included in the one or more queries, over which communications occurred during the predefined or specified time period, and identifies additional connections made or received by the identified entities distinct from the reciprocal connections. Further, updating the list of connections to be processed by removing the connections identified by the one or more queries and adding the additional connections identified by the information received in response to the one or more queries.

In some embodiments, the connections included in the list of connections made or received by entities identified by the first layer of application mapping information include only connections to entities at application servers. In some embodiments, the connections included in the list of connections to be processed include only connections to entities at application servers.

(A3) In some embodiments, the method of any of A1-A2 includes, after performing the plurality of iterations of the predefined map gathering operation: for a respective application entry point, identifying, in the application map, layers of entities participating in the performance of the respective application; and generating and preparing for display an application-specific map specific for the respective application, comprising the identified layers of entities participating in the performance of the respective application.

(A4) In some embodiments of the method of any of A1-A2, the identified one or more entities, comprising application entry points, are a single entity for a single, first application, the application map is a first application map, and the method further includes: combining the application map for the first application with a second application map for a second application distinct from the first application to produce a combined application map, the combining including identifying, in the combined application map, entities supporting more than one application, wherein the entities supporting more than one application comprising are entities in the first application map that overlap with entities in the second application map. The method includes presenting a representation of at least a subset of the combined application map, including information corresponding to the entities, in the combined application map, supporting more than one application.

(A5) In some embodiments of the method of any of A1-A4, the one or more user-selectable further processing options include a plurality of options for filtering the application map, and the method includes: identifying portions of the application map satisfying one or more user-selected options of the plurality of options for filtering the application map; and presenting a representation of the identified portions of the application map satisfying the user-selected options for filtering the application map.

(A6) In some embodiments of the method of any of A1-A4, the one or more user-selectable processing options presented in the interactive user interface include: one or more performance information options to select types of performance information to present with respect to one or more machine or processes participating in the performance of a respective application mapped by the application map. Further, the method includes obtaining and presenting performance information corresponding to user selected types of performance information for one or more user selected machines or processes, selected using the interactive user interface.

(A7) In some embodiments of the method of any of A1-A4, the one or more user-selectable processing options presented in the interactive user interface include: one or more options for comparing the application map with one or more other application maps; and the method includes presenting a comparison of the application map with the one or more other application maps.

(A8) In some embodiments of the method of A7, the presented comparison is configured to identify entities in the compared application maps meeting predefined hot spot criteria.

(A9) In some embodiments of the method of any of A1-A4, the one or more user-selectable processing options presented in the interactive user interface include one or more options for storing the application map as an application map snapshot, for comparison with other application map snapshots at a future time.

(A10) In some embodiments of the method of any of A1-A4, the one or more user-selectable processing options presented in the interactive user interface include one or more options for viewing security and/or risk information overlaid on the application map.

(A11) In some embodiments of the method of any of A1-A10, the generated application map is a current application map snapshot, and the method includes the server system updating the application map according to a predetermined schedule, by performing, at respective times, the application mapping procedure to generate a respective application map snapshot at each of the respective times.

(A12) In some embodiments of the method of any of A1-A11, the generated application map is a current application map snapshot, and the method includes the server system comparing the current application map snapshot with one more previously generated application map snapshots, so as to identify changes, if any, in the entities participating in the performance of each of one of more applications.

(A13) In some embodiments of the method of any of A1-A11, the method includes: sending from the server system, via a first linear communication orbit on the one or more linear communication orbits in the network, to a respective machine in the plurality of machines a direct communication instruction for establishing a direct duplex connection between the respective machine and the server system, wherein the respective machine, in response to receiving the direct communication instruction through the linear communication orbit, sends an outbound connection request to the server system to establish the direct duplex connection between the respective machine and the server system. The method further includes the server system downloading through the direct duplex connection local context data related to one or more operations performed by the respective machine while participating in the execution and resulting performance of a respective application mapped by the application map.

(A14) In some embodiments of the method of A13, the direct duplex connection is a secure websocket connection.

(A15) In some embodiments of the method of A13 or A14, the local context data includes local context data concerning predefined communications between the respective machine and a second machine of the plurality of machines, and the second machine is located at a node of a second linear communication orbit coupled to the server system, the second linear communication orbit being distinct from the first linear communication orbit.

(A16) In some embodiments of the method of any of A13-A15, the local context data identifies at least one executable file corresponding to one or more components of the respective application, and at least one inbound or outbound port for communicating data in association with each of the one or more components.

(A17) In some embodiments of the method of any of A1-A16, the one or more queries comprise requests for information concerning inbound and/or outbound connections made during the predefined or specified time period, and include one or more filters specifying at least one of a number of connections, a frequency of connection, and a duration of connection with respect to the connections made during the predefined or specified time period.

(A18) In some embodiments of the method of A17, the one or more filters further specify a computer group according to at least one machine characteristic, and the information received in response to the one or more queries is received only from machines having the at least one machine characteristic.

(A19) In some embodiments of the method of A17, the server system is coupled to an administrator machine, and the method includes, at the server system, receiving from the administrator machine a map instruction to perform the application mapping procedure and to convey the resulting application map to the administrator machine.

(A20) In some embodiments the method of any of A1-A19 includes, at each machine of a first set of machines in the plurality of machines, in response to a respective query of the one or more queries sent by the server system: identifying one or more processes, locally executed by the machine, corresponding to an entity or connection identified by the respective query; for each of the identified processes, identifying predefined communications by the identified process, during the predefined or specified time period; and sending to the server system application mapping information, including information identifying the predefined communications by the one or more identified processes during the predefined or specified time period.

(A21) In some embodiments of the method of A20, the application mapping information sent by the machine to the server system includes statistical information corresponding to the predefined communications identified by the application mapping information, the statistical information identified by the application mapping information including information about the number, duration, and/or frequency of communications and/or amount of information conveyed between the machine and a respective other machine.

(A22) In some embodiments the method of any of A1-A19 includes, at each machine of a first set of machines in the plurality of machines, monitoring local events meeting one or more definitions, and storing metadata for the monitored events in a local metadata database, stored at the machine. The method further includes, at each such machine, in response to a respective query of the one or more queries sent by the server system, extracting from the local metadata database information identifying predefined communications made by one or more processes performed by the machine the predefined or specified time period; and sending, via a linear communication orbit of the one or more linear communication orbits, to the server system, the information, extracted from the local metadata database, identifying predefined communications made by one or more processes performed by the machine the predefined or specified time period.

(A23) In another aspect, a computational machine for mapping applications executed by a plurality of machines in a network (the network comprising the plurality of machines located at one or more non-static collections of nodes, each non-static collection of nodes forming a linear communication orbit, the network including one or more linear communication orbits) includes one or more processors, and memory having instructions stored thereon, which when executed by the one or more processors cause the computational machine to perform the method of any of A1-A19.

(A24) In yet another aspect, a computer readable storage medium stores one or more programs configured for execution by a computational machine for mapping applications executed by a plurality of machines in a network, the network comprising the plurality of machines located at one or more non-static collections of nodes, each non-static collection of nodes forming a linear communication orbit, the network including one or more linear communication orbits, the one or more programs comprising instructions for performing the method of any of A1-A19.

BRIEF DESCRIPTION OF THE DRAWINGS

FIG. 4 is a flow chart of a method for generating an application map for one or more multi-tier applications in a network in accordance with some embodiments.

Like reference numerals refer to corresponding parts throughout the drawings.

DESCRIPTION OF EMBODIMENTS

Figure 1A:
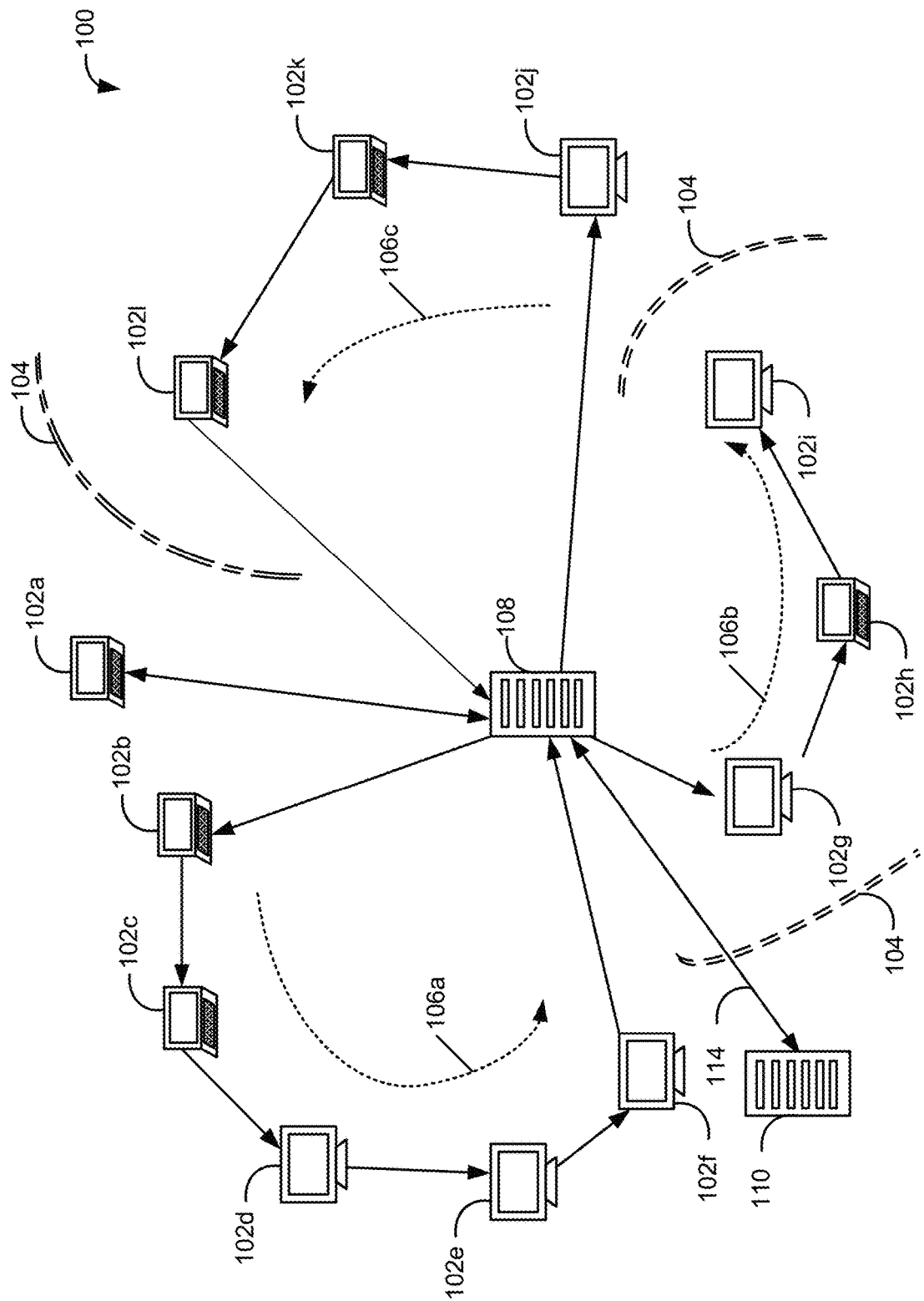
FIGS. 1A-1B illustrate a computer network organized into linear communication orbits, in accordance with some embodiments.

Some methods and devices described in the present specification improve upon application mapping methods, sometimes called application dependency mapping methods, by determining iteratively whether computational machines at individual client nodes of an established linear communication orbit (shown in FIGS. 1A and 1B) host one or more processes belonging to an identified multi-tier application. A multi-tier application includes multiple distinct processes, each performing a different function of the application. For example, a 3-tier application can include a server process (first tier), multiple application logic processes (second tier), and multiple database processes (third tier). Examples of multi-tier applications are shown in FIG. 2, where processes performing the various portions or functions of the applications can be running on a same computational machine, or different computational machines at different nodes in the established linear communication orbit. Portions of the application mapping procedure are performed by the computational machines that host the processes that perform the various functions of the applications being mapped, and the resulting application map information is received and aggregated by a server or administrative machine to produce one or more application maps.

In the application mapping methods described below, instead of requiring an administrator to generate a definition for each application, and then search a distributed set of computational machines for components (e.g., processes) of the application that match the application definition, application maps are generated by iteratively gathering information from the distributed set of computational machines. As described in more detail below, components of a multi-tier application are automatically located in the distributed set of computational machines, without requiring the use of an application definition. The application mapping methods typically begin with identification of the entry point for each application to be mapped, where each entry point is the process that receives client requests, sometimes called user requests, for a particular application. Examples of entry points are web servers that receive requests sent using the http protocol, or other network communication protocol or application protocol, to the URL (uniform resource locator) or web address for the corresponding applications. Once the entry point for an application has been identified, an iterative procedure searches the network for processes that communicate with other processes that are components of the application, with each iteration adding a layer of processes, or application components, to the application map for the application. Once a last layer has been added to the application map, in addition to presenting a representation of the application map to a user, the application map is supplemented or overlaid with other information, or compared with prior versions of the application map, to enable a user (e.g., an administrator) to better understand the structure of the application and assess its performance, differences in its properties over time, vulnerabilities, etc.

Linear communication orbits are described below with reference to FIG. 1A. FIG. 1B illustrates a schematic diagram of a direct duplex connection between a node in a linear communication orbit and a remote server (e.g., investigating server 110, FIG. 1B). Some aspects of multi-tier applications are explained with reference to FIG. 2. Methods for generating an application map are described with reference to FIG. 4 (method 400). FIGS. 6-9 are block diagrams of machines (e.g., a computation machine, sometimes called an endpoint machine, located at a node of a linear communication orbit; an administrator's device; a server of a network; and a remote investigating server) whose roles in the execution of applications, and in the mapping of those applications, are described below.

Figure 1B:
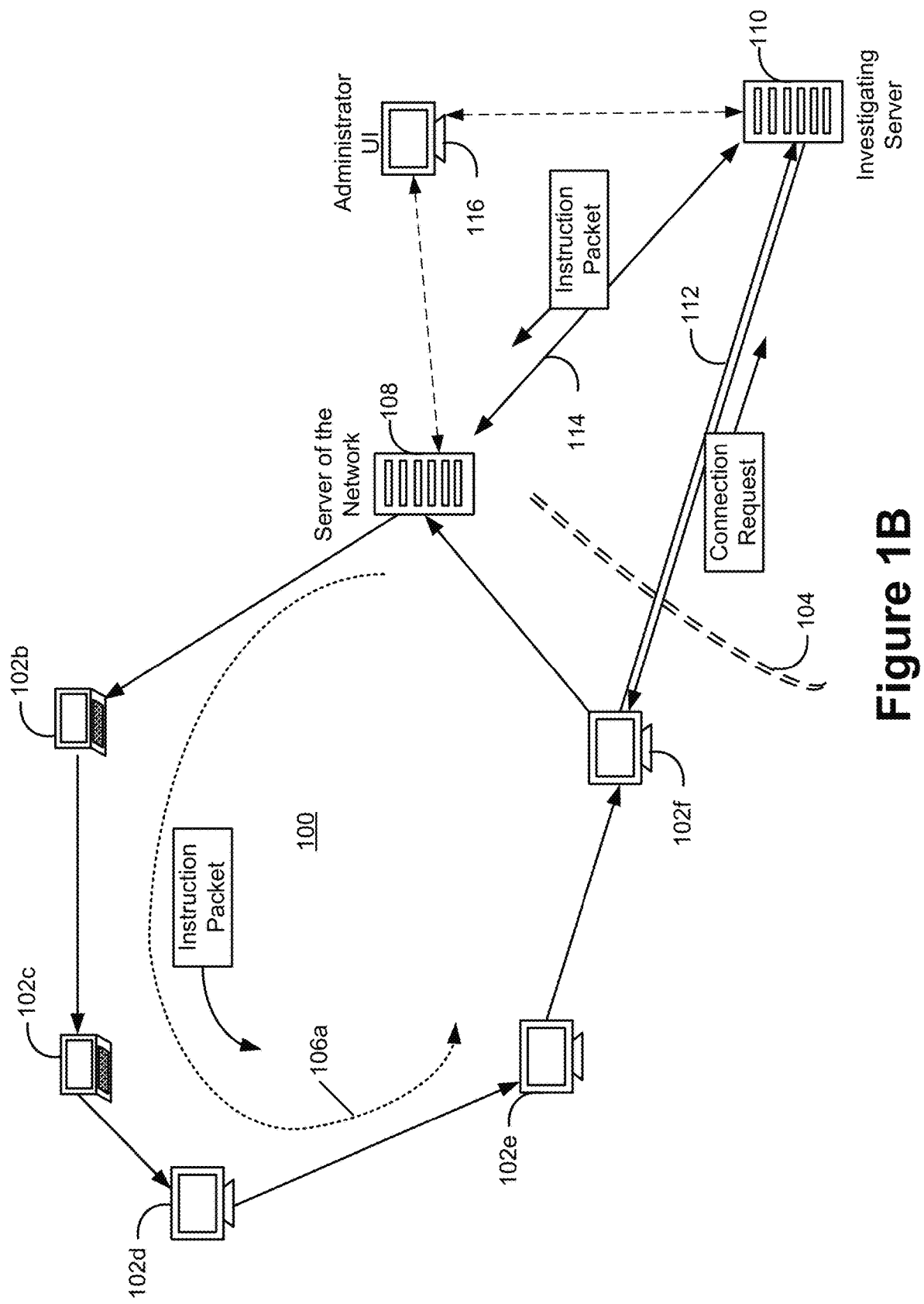
Figure 2:
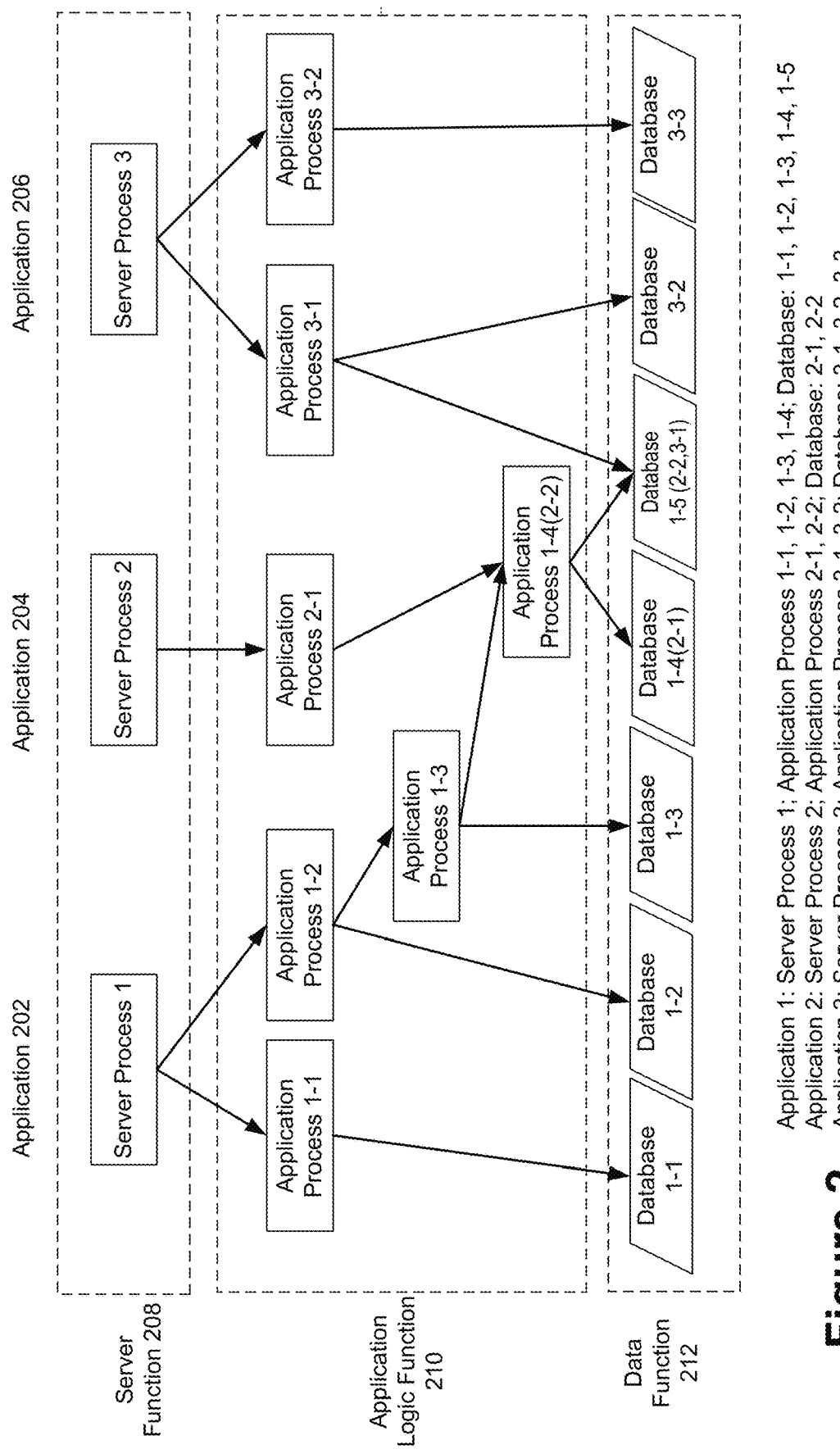
FIG. 2 is a block diagram illustrating process dependencies in example multi-tier applications executing in a network, in accordance with some embodiments.

FIG. 1A illustrates a computer network organized into linear communication orbits, in accordance with some embodiments. More specifically, FIG. 1A illustrates a managed network 100 (sometimes called a distributed system) having a plurality of interconnected machines or nodes 102 (including 102a-1), e.g., computers, servers, mobile devices, and other networked devices that are arranged into one or more linear communication orbits. It would be appreciated that the terms "machine" and "node" throughout this disclosure are used interchangeably, although sometimes machines (also called computational machines) are described as being located at particular nodes of the network 100. In some embodiments, the application mapping methods described herein are performed at one or more nodes (e.g., node 102, see FIGS. 1A and 1B) of a linear communication orbit. It would be appreciated that the terms "application dependency map" and "application map" throughout this disclosure are used interchangeably. In some embodiments, the methods described herein are performed, at least in part, at a remote server (e.g., investigating server 110) that is not part of network 100 and is optionally separated from network 100 by a firewall 104, see FIGS. 1A and 1B). In some embodiments, the methods described herein are performed at an administrator's machine 116 (e.g., a computer system or computer implemented device, as discussed below with reference to FIG. 7) that interacts with one or more nodes 102 through server 108 of the network and/or remote server 110, see FIG. 1B).

The application mapping methods are described herein using linear communication orbits to sequentially convey queries to computational machines at sequentially arranged or ordered nodes of the linear communication orbits, and to collect from those computational machines information, sent by those machines in response to the queries, that is used to generate an application map. The use of the linear communication orbits, to convey queries and receive the information produced in response, makes the application mapping procedure very efficient in terms of the network communication resources, which in turn allows the application map process to be completed quickly, even when the components of the applications are hosted by computational machines in a distributed system having thousands of computational machines, with no advance knowledge as to which computational machines in the system are hosting the components of any particular application.

In other embodiments, the application mapping procedure is performed in a distributed system in which the computational machines are located at nodes of a hub-and-spoke network, tree-structured network, or mesh network, but in such embodiments, the benefits and efficiencies of using linear communication orbits are lost.

Examples of managed network 100 include enterprise networks or other networks under common management. In some embodiments, at least some of machines or nodes 102 in the managed network 100 are distributed across different geographical areas, while in some embodiments groups of the machines or nodes 102 are located at the same physical location (e.g., at the same data center or facility). In some embodiments, machines or nodes 102 coupled to managed network 100 are divided into several sub-networks separated by one or more firewalls 104. In some embodiments, the network 100 is separated from external networks by one or more firewalls 104.

In some embodiments, the machines or nodes 102 in network 100 are self-organized into segments of one or more linear communication orbits 106. In some embodiments, managed network 100 also includes server 108 that facilitates the creation and maintenance of the one or more contiguous segments 106. The server 108 may be relatively lightweight, and may be elected from nodes 102 in the network.

In some embodiments, as shown in FIG. 1A, the linear communication orbit linking all of the nodes of network 100 includes a respective communication channel between each pair of adjacent nodes in an ordered sequence of nodes 102 in network 100. In some embodiments, communication between a pair of adjacent nodes 102 (e.g., machine 102g and machine 102f) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each node 102 joining network 100 is equipped with (or provided with) a set of predetermined rules. According to the set of predetermined rules, each node 102 finds its immediate neighbor nodes and coordinates with these immediate neighbor nodes to self-organize into a local segment of a linear communication orbit. The local segments of adjacent nodes overlap and fuse into a contiguous segment of the linear communication orbit. In some embodiments, the linear communication orbit grows or contracts as nodes join and leave network 100 (e.g., the network is non-static), through the independent local actions of the nodes in network 100, without global, continuous, and/or active intervention by any network administrative programs or personnel. Although all nodes 102 implement the same set of rules, and each node directly interacts only with its immediate neighbor nodes to facilitate the formation of the orbit, the rules are designed in a way that cause the machines' independent local actions to be globally consistent and to result in self-organization and automatic repair and maintenance of linear communication orbit(s) 106.

In some embodiments, all nodes 102 coupled to network 100 are sorted into an ordered sequence according to a respective unique identifier associated with each machine or node 102. These identifiers are also referred to as machine identifiers, or as the addresses of the machines or nodes in the network. For example, in some embodiments, respective IP addresses of nodes 102 are used as the identifiers to sort the machines into an ordered sequence. In some embodiments, the nodes are sorted according to decreasing IP address values, an upstream direction of the linear communication orbit is the direction of increasing IP address values, and a downstream direction of the linear communication orbit is the direction of decreasing IP address values. In some embodiments, the nodes are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined rules provides a deterministic way of sorting the unique identifiers or addresses of that type into an ordered sequence. Given the identifiers or addresses of two nodes in the network, the relative order of the two nodes and their distances in the linear communication orbit (also referred to as an interval between the two machines or nodes) can be determined. In some embodiments, not all possible addresses are occupied by a corresponding node in the network.

In some embodiments, each node 102 receiving a communication message (e.g., a query, or a query message including a question part and an answer part (sometimes called a query portion and an answer portion or response portion)) from its upstream neighbor node acts upon the message by providing an update to the message based on its local state or information, performing some aggregation of the information in the message (e.g., by adding to or modifying aggregated results already included in the message as received from its upstream neighbor), executing instructions included in the message, performing determinations according to criteria specified in the message, and/or forwarding the message to its downstream neighbor node along the linear communication orbit. Essentially, each machine or node expends a small amount of resources to take on a small part of the duties of data aggregation without being overly burdened.

In the application mapping scenario, in some embodiments, the message sent to each node in a linear communication orbit is a query, sometimes called an application mapping query, sent by a server. The query identifies communication channels used by entities already known to be components of an application, and thus already included in the application map being generated for the application, and requests information regarding entities that use any of the identified communication channels. In such case, a respective node that receives the message acts upon the message by identifying information requested by the query. In some embodiments, the information requested by the query is information identifying processes, if any, executing on the respective node that have sent communications over any of the communication channels identified in the query, during a specified or predefined time period, and information identifying communications channels used by the identified processes to communicate with additional components of the application not yet included in the application map being generated for the application. After receiving the query and identifying the information requested by the query, the respective node returns the requested information through the linear communication orbit to the server that sent the query. Depending on the implementation, the requested information is conveyed using a payload portion of the application mapping query, or the payload portion of a subsequent query, that traverses the linear communication orbit and collects the requested information from each node of the linear communication orbit that hosts any processes that are components of the application being mapped.

In some embodiments, in response to receiving the application mapping query, the node stores in a local mapping database metadata, or information corresponding to the metadata, associated with the one or more identified processes executing on the respective node, and metadata or information for the identified communication channels used by the identified processes to communicate with additional components of the application not yet included in the application map being generated for the application. The information stored in the local mapping database is added to the payload portion of the application mapping query, or a subsequent query, and returned with the application mapping query or subsequent query, via the local communication orbit, to the server that sent the application mapping query and/or subsequent query.

More details on how messages are propagated to nodes or machines 102 in network 100 through linear communication orbit(s) 106 are provided in the Incorporated Disclosure.

In some embodiments, each node implements a set of common rules such that each node in the linear communication orbit knows what to do with respect to each query it receives or knows about, without requiring excessive back and forth interactive communications between the nodes themselves or between the nodes and the central management of a server or administrator. This set of common rules is different from the set of common rules for establishing and maintaining the linear communication orbit as described in the Incorporated Disclosure, and can be used in addition to the set of common rules for establishing and maintaining the linear communication orbit.

An advantage of message communication over the linear communication orbit is that queries, answers, and/or instructions regarding a specified application or a specified node can be quickly passed to and from a node 102 or server 108 without excessive communication and computational overhead.

In some embodiments, server 108 (or a remote server 110 in communication with server 108) provides application mapping queries for propagation to nodes in one or more linear communication orbits 106. The application mapping queries may be generated by server 108, a remote server 110, or an administrator's machine 116 (see FIG. 1B). In some embodiments, each application mapping query is for extracting information about whether nodes 102 in network 100 execute processes that are components of one or more multi-tier applications, and more specifically extracting information about whether nodes 102 in network 100 execute processes that are in communication with one or more processes already known to be components of the one or more multi-tier applications for which an application map is being generated.

In some embodiments, the server determines the order, frequency, and/or priority by which application mapping queries are sent to the nodes in the one or more linear communication orbits 106. In some embodiments, the server sends out a sequence of application mapping queries according to a predetermined schedule, e.g., every hour, so as to generate new snapshots of the application map(s) at corresponding predetermined intervals. Thus, the application map for a specified application may be updated every hour (or other interval) according to the predetermined schedule. The application mapping queries include criteria that individual nodes locally evaluate, and each individual node sends results, if any, back to server 108 through the linear communication orbit 106 that includes that node.

In some embodiments, server 108 sends the results (e.g., sends an aggregated response) to remote server 110. In some embodiments, server 108/110 determines whether any of the components of an application have failed, or whether they satisfy predefined remediation criteria, and if so, server 108/110 automatically initiates one or more remedial actions, such as restarting a failed process, moving a component of an application to a different computational machine than the computational machine on which it was previously executing. In some embodiments, remote server 110 communicates with server 108 via a secure connection 114.

In some embodiments, when remote server 110 needs to send a message to a particular node in the network and a direct connection between remote server 110 and the particular node does not already exist, remote server 110 sends the message to server 108 and has server 108 forwards the message to the particular node along the linear communication orbit.

In some embodiments, remote server 110 starts a network-wide information gathering process by sending a series of queries or requests to server 108 (or a starting node of the linear communication orbit), allowing server 108 (or the starting node) to propagate the queries or requests into the network along the linear communication orbit, and receiving answers or evaluation results (e.g., individual answers, aggregated answers, and/or metrics and statistics computed based on the answers or evaluation results collected from the nodes in the network) from server 108 (or an end node of the linear communication orbit).

The lightweight, decentralized mechanism (e.g., the set of common action rules observed by the nodes in the network)

allows the nodes in the network to self-organize into one or more linear communication orbits, and allows the linear communication orbits to recover/self-heal from broken links and slow connections (e.g., by temporarily bypassing the unresponsive nodes) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the nodes in separate messages, and the messages may be propagated down the linear communication orbit, processed in parallel at the nodes, and answered by as many nodes as possible (e.g., nodes that satisfy per matching criteria specified by the messages), without being held up by any slow responding nodes. In fact, communication with and data collection from any and all nodes in the network (e.g., enterprise networks with thousands or millions of nodes) may be accomplished in substantially real-time (e.g., a matter of seconds), as opposed to taking days and weeks in a network with a conventional hierarchical or hub-and-spoke configuration. For example, messages are delivered to the nodes at the speed at which messages are propagated through the linear communication orbit, and the processing of the queries at the nodes occurs after receiving the messages, in parallel at the nodes. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 (sometimes herein called an investigating server) is configured to communicate (e.g., sends messages and/or queries) directly with a respective node (e.g., node 102f) over direct duplex connection 112 (e.g., a Web Socket connection). Various methods are provided herein for establishing direct duplex connections between remote server 110 and nodes 102 in a linear communication orbit. Direct duplex connection 112 is particularly useful when a remote server needs to take a deep-dive into a respective node in the network (e.g., to carry out frequent back and forth interactions and/or to transfer large amount of local event data and/or deploy a security patch), rather than investigating the network at-large. The messages and/or queries can be analogous to those described above, but they are sent directly to the respective node via direct duplex connection 112 (rather than being propagated through linear communication orbit 106a), and without the communication needing to be bridged by server 108. In some embodiments, remote server 110 can communicate with the respective node either through direct duplex connection 112 (e.g., when remote server 110 wants to query only the respective node) or through linear communication orbit 106a (e.g., when remote server 110 wants an aggregated response to a query from some or all of the nodes 102 in the linear communication orbit 106a).

As described herein, the direct duplex connection between a particular node and remote server 110 is established with the particular node as the initiating party. In other words, from the perspective of the network, the connection is established with an outbound connection request sent from the node, rather than with an inbound connection request sent from the remote server. When the direct duplex connection is established with an outbound connection request sent from the node (e.g., the node sends the initial connection request in the connection establishment protocol (e.g., the handshake request in establishing a Web Socket connection), there is no need to open the firewall of the network, which would expose the network to outside security risks.

In some embodiments, in order to prompt a particular node to initiate the connection request for a direct duplex connection, remote server 110 sends a message or instruction packet to the particular node (e.g., node 102f) through a server of the network (e.g., server 108) and has the message or instruction packet propagated to the particular node through the linear communication orbit (e.g., linear communication orbit 106a). The message or instruction packet contains instruction and necessary data (e.g., public certificate for encryption, IP address, port number) for the particular node to establish the direct point-to-point persistent connection (e.g., a Web Socket connection) with the remote server. When the particular node receives the instruction packet from its upstream node, the particular node initiates the outbound connection request to the remote server. After the remote server receives the connection request from the particular node, the remote server and the node can proceed to establish the duplex connection according to the connection protocol.

In some embodiments, the instruction packet can be dispatched to one or more particular nodes at the command of a network administrator or incident responder. For example, the network administrator uses an administrator's machine 116 (e.g., a computer system or computer implemented device, as discussed below with reference to FIG. 7) to connect to remote server 110 (e.g., via a web interface or a client application provided by a service provider associated with the remote server 110) and manually selects the particular nodes using a network monitoring user interface. In some embodiments, the network monitoring user interface provides other functions, such as generating and modifying application definitions, generating and modifying map requests, displaying interactive maps, providing users with the ability to interact (e.g., changing views, applying additional filter criteria, etc.) with generated interactive maps, etc.

In some embodiments, an event recorder is deployed on each node in the network. The event recorder continuously records information about events that occur at the node, storing local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from a network monitoring user interface by issuing queries through the linear communication orbit. For example, the administrator's device can send the questions to the server of the network and the questions may be packaged in query messages and propagated by the server to nodes in the linear communication orbit. Each node along the linear communication orbit is able to quickly respond to these questions by searching or filtering event data stored in their respective local event databases. After the answers have been collected from all relevant nodes in the network, the server of the network forwards the answers back to the administrator's device.

In some embodiments, after a direct duplex connection has been established between a particular node and the remote server, the administrator can also query the local event database of the particular node through the direction duplex connection. In addition, the administrator can take a snapshot of the local event database on the particular node and have it uploaded to the remote server, so that in-depth analysis regarding the particular node may be performed at the remote server (e.g., according to instructions provided by the administrator to the remote server). More details of the local event database are provided with reference to FIG. 6.

In some embodiments, after a direct duplex connection has been established between a particular node and the remote server, the administrator can collect event data corresponding to connectivity data meeting one or more definitions from the local event database. The administrator can query the particular node about operations meeting various definitions and operations with unknown relationship to specified applications for which the node is configured to monitor connectivity traffic. Collected event data may be grouped by traffic associated with monitored applications, and traffic determined to be not associated with monitored applications. The administrator can make a copy of the event data collected from the local event database and local context data (e.g., OS version, memory, installed apps, usernames, etc.) describing the local environment of the particular node, and use them to create new or modify existing application map information queries.

In some embodiments, based on the in-depth analysis performed on a particular node, the administrator can be prompted to perform particular additional actions by an application map module. For example, in some embodiments the administrator is presented with sample queries, or sample filters for excluding irrelevant event information or for focusing on potentially relevant event information. In some embodiments, the administrator is presented with a query building interface enabling the administrator to generate new application mapping queries, including retroactive requests to generate application map snapshots for time periods prior to a current time period, based on event history data stored in the local event databases of endpoint machines in one or more local communication orbits.

FIG. 2 is a block diagram illustrating process dependencies in example multi-tier applications executing in a network, in accordance with some embodiments. A multi-tier application is engineered to have different functions logically and/or physically separated—with different functions being executed on different machines, and/or by different processes, typically distributed over multiple machines, but optionally with one or more of the processes being executed by the same machine. Three commonly used functions of any multi-tier application include server function 208 (e.g., providing access to the application via URL or other entry point), application logic function 210 (e.g., performing the primary logical functions of the application), and data function 212 (e.g., accessing data used by the application, storing and updating data created or updated during execution of the application, typically on behalf of or at the request of a user or client process). Each of these three functions is implemented by one or more processes executing on one or more nodes of a network, and the processes use inter-process communication to communicate with each other and synchronize actions. Processes implementing server function 208 are responsible for receiving user requests, and preparing tasks and results for presentation to a user. Example server processes include Apache® web server, Microsoft® IIS web server, NGINX® web server, and so on. Processes implementing application logic function 210 are responsible for executing commands, performing calculations, transferring data, and other tasks related to the software logic of the application. Example application logic processes include software modules written in Python®, Java®, PHP®, and other programming languages. Processes implementing data function 212 are responsible for storing and retrieving information from file systems. Example data processes include MySQL® processes, MongoDB® processes, and so on.

In some embodiments, processes of a multi-tier application are running on one or more nodes of a linear communication orbit. Each process in the linear communication orbit is uniquely identified by a combination of network data, including the IP address of the hosting node, the process name, and the port numbers used by the process. Inter-process communications typically utilize these identifiers, and are further defined by traffic direction (inbound v. outbound). In some embodiments, processes in communication with each other (e.g., application process 1-1 and database 1-1), within a respective multi-tier application, can be deployed to the same node or adjacent nodes on a linear communication orbit. In some examples, a process (e.g., application process 1-4(2-2)) is shared by multiple applications (e.g., application 202 and application 204).

In the example shown in FIG. 2, application 202 is a multi-tier application that includes ten different processes. In some embodiments, and in this example, all of these processes are running on (sometimes said to be "hosted by" or "hosted on") machines in the same linear communication orbit, but in some other embodiments, these processes are running on machines in two or more linear communication orbits. On the top level, application 202 includes a server process 1 running on a node of the linear communication orbit; for example running on an application server or other server that is located at a node of the linear communication orbit. Server process 1 establishes outbound communication with application process 1-1 and application process 1-2. Application process 1-1 and 1-2 are responsible for implementing business logic of application 202. In addition, Application process 1-2 communicates with application process 1-3 and application process 1-4(2-2) to further delegate portions of the application logic. On the bottom level, application process 1-1, 1-2, 1-3, and 1-4(2-2) establish communication with databases 1-1, 1-2, 1-3, 1-4(2-1) and 1-5(2-2, 3-1), respectively. Database 1-5(2-2, 3-1) is shared by all three of the applications shown in FIG. 2. Application process 1-4(2-2) further communicates with a second database 2-2(3-1).

Figure 3A:
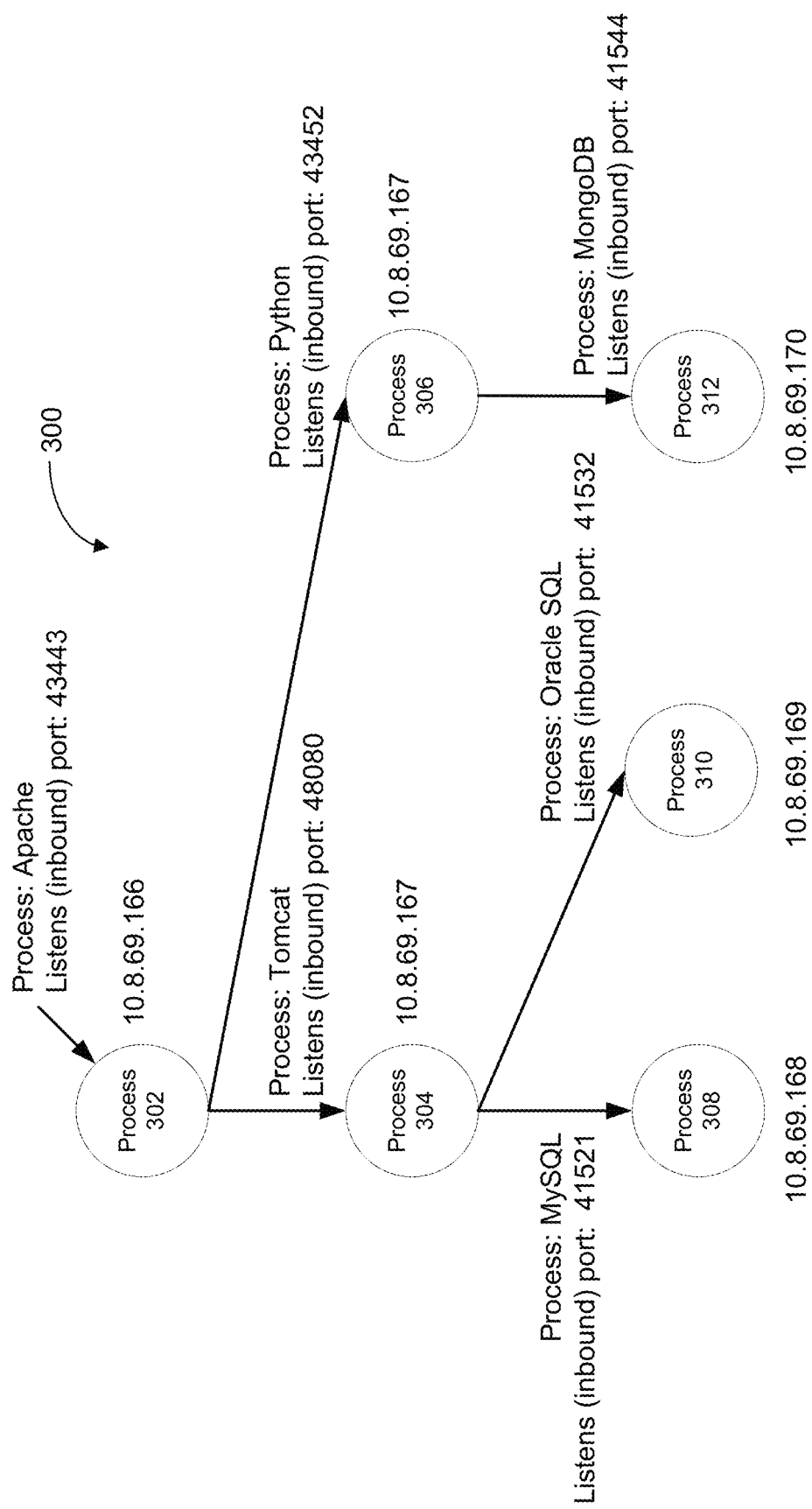
FIG. 3A illustrates an example of an application map generated using the method described herein with reference to FIG. 4, in accordance with some embodiments.

FIG. 3A illustrates an example of an application map 300, in accordance with some embodiments. Application map 300 shown in FIG. 3 shows the components of a particular application, and communication channels between those components. The application is accessed via client processes not shown in FIG. 3, via an entry point or parent node 302 of the application. For example, process 302 can be a server process (e.g., running on an application server or other server) that interfaces with users of the multi-tier application.

Nodes in application map 300 represent different processes belonging to an application running in the linear communication orbit (or, alternatively, one or more linear communication orbits), and arrows connecting the nodes indicate established communication channels and directions. Application maps help visualize complex application flow in a multi-tier application, and provides valuable information to network administrators. Such information is useful to network administrators in a variety of situations, such as when augmenting applications with additional functions or migrating functions such as databases to different machines, discussed in more detail below. An example of process for generating application maps is described herein with reference to FIG. 4.

In some embodiments, a respective application map is a tree data structure in which each process of a respective application is represented by a node and each communication channel used by those processes to communicate with other processes of the application is represented by an edge. The parent node of an application map (e.g., application map 300) indicates an entry point process (e.g., entry point process 302). The entry point process can be manually entered by an administrator or auto-identified, for example by using a procedure that detects communications having the characteristics of requests to web servers, and that identifies the processes that receive those communications as entry point processes. In the example shown in FIG. 3, process 302 is associated with an IP address, "10.8.69.166", which is the IP address of a machine (at a node in the network) on which process 302 is running. Process 302 is also associated with a process name "Apache" and is configured to receive communications (e.g., from client processes accessing an application) using listening port number "43443", and to send communications to process 304 at IP address "10.8.69.167" via listening port number 48080 of the machine at IP address "10.8.69.167". In addition, process 302 is also configured to send communications to a second process at the same IP address, process 306 at IP address "10.8.69.167", via listening port number 43452 of the machine at IP address "10.8.69.167".

Process 302 has two child nodes—processes 304 and 306. Processes 304 and 306 are both associated with IP address "10.8.69.167," indicating that they are running on a same node (i.e., the same machine) in the linear communication orbit. Process 304 has process name "Tomcat" and an inbound port number "48080," and process 306 has process name "Python" with a different inbound port number "43452." For example, process 304 and process 306 can implement application logic functions of the multi-tier application.

Process 304 sends outbound communications to process 308 and process 310. Process 308 is associated with an IP address "10.8.69.168," a process name "MySQL," and an inbound port number "41521." Process 310 is associated with an IP address "10.8.69.169," a process name "Oracle SQL," and an inbound port number 41532. Process 306 sends outbound communications to process 312, which is associated with an IP address "10.8.69.170," a process name "MongoDB," and an inbound port number "41544." For example, process 308, 310, and 312 implement data storage and retrieval functions of the multi-tier application.

Figure 3B:
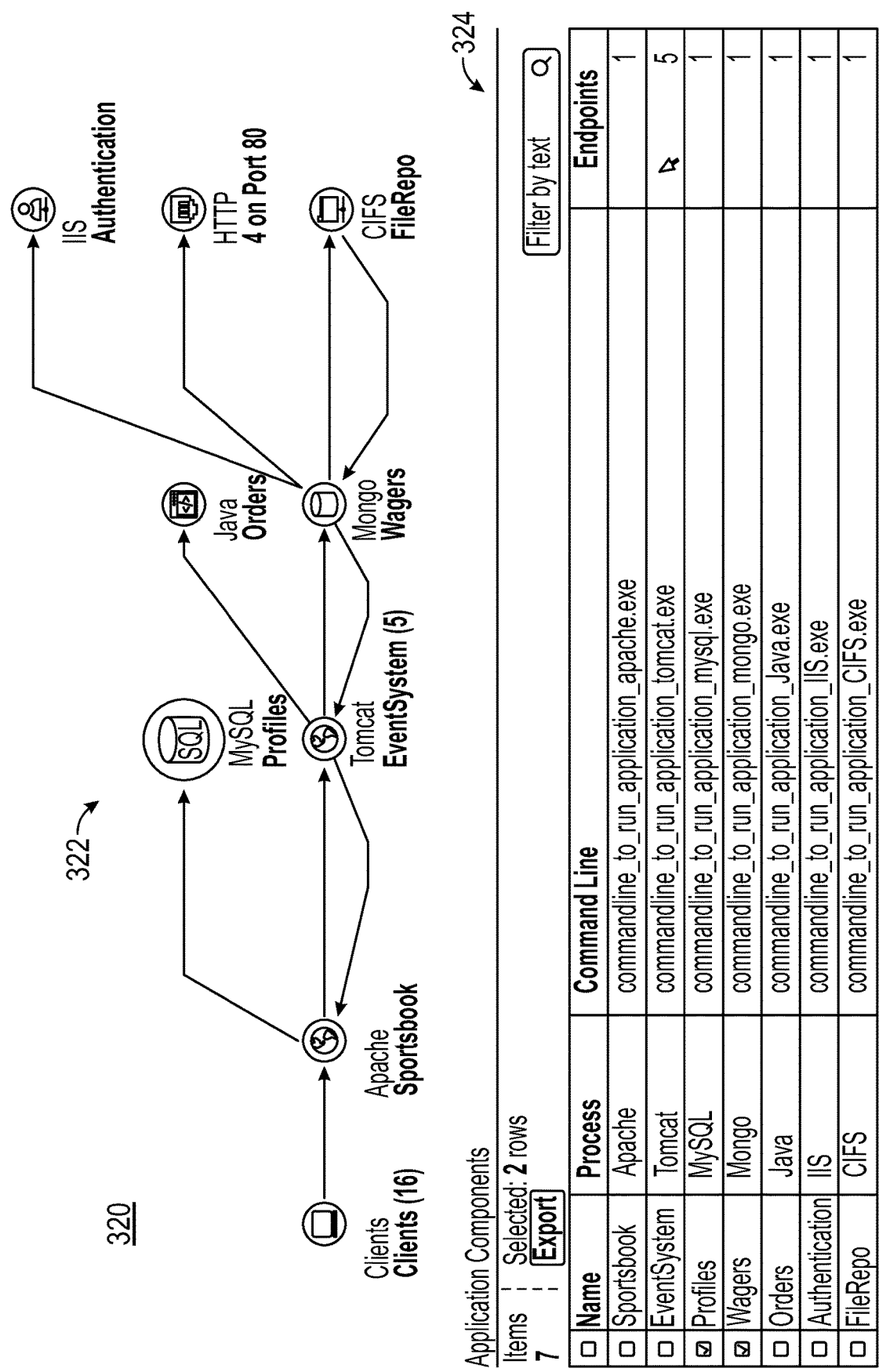
FIGS. 3B-3D illustrate a user interface in which an application map is presented and information regarding a respective coalesced component is expanded in response to a user request, in accordance with some embodiments.

FIG. 3B depicts a user interface 320 that presents an application map 322 similar to the application map 300 in FIG. 3A, but with each component in the application map 322 having an identifier extracted from metadata associated with one or more components in the application map. In some embodiments, user interface 320 is produced by an application map module (e.g., module 724, FIG. 7, or module 824, FIG. 8) at an administrator's machine (e.g., administrator's device 116) or a server (e.g., server 108), for use by a user of the administrator's machine or server. Additional information regarding each component, such as IP address, component name, process name, and optionally other component data that identifies and/or provides information and context about the component, is accessible to the user by selecting that component requesting additional information using a menu of options or other user interface mechanism. In FIG. 3B, the "Apache Sportsbook" component corresponds to component 302 in FIG. 3A, and corresponds to an application entry point for the "Sportsbook" application. The "Clients" component in FIG. 3B is a coalesced component corresponding to sixteen client entities that accessed the Sportsbook application in a time period corresponding to the time period for which the application map in FIG. 3B was generated. It is noted that the "Clients" component(s) are typically not located at application servers.

Another example of a coalesced component in application map 320, in FIG. 3B, is the "Tomcat EventSystem" component, which corresponds to (and is displayed in place of) five application components (sometimes herein called entities or application components) all having identifiers or names that include the string "EventSystem" or text that closely matches "EventSystem," that are all located at the same level of the application map, and are all connected to either the same other components (e.g., the Sportsbook, Orders and Wagers components) or to other components having identifiers or names that meeting predefined clustering or coalescing criteria. In some embodiments, user interface 320 also includes a listing 324 of application components, for example, in the form of a table. In the example shown in FIG. 3B, the EventSystem component is listed in the table as corresponding to 5 endpoints (e.g., 5 computational machines). In some embodiments, additional information regarding any respective component in application map 322, or in the Application Component listing 324, is accessed by user selection of the respective component in application map 322, or in the Application Component listing 324, and optionally specifying the additional information requested by the user (e.g., through the use of a pull-down menu that is activated when the application component is selected by the user).

Figure 3C:
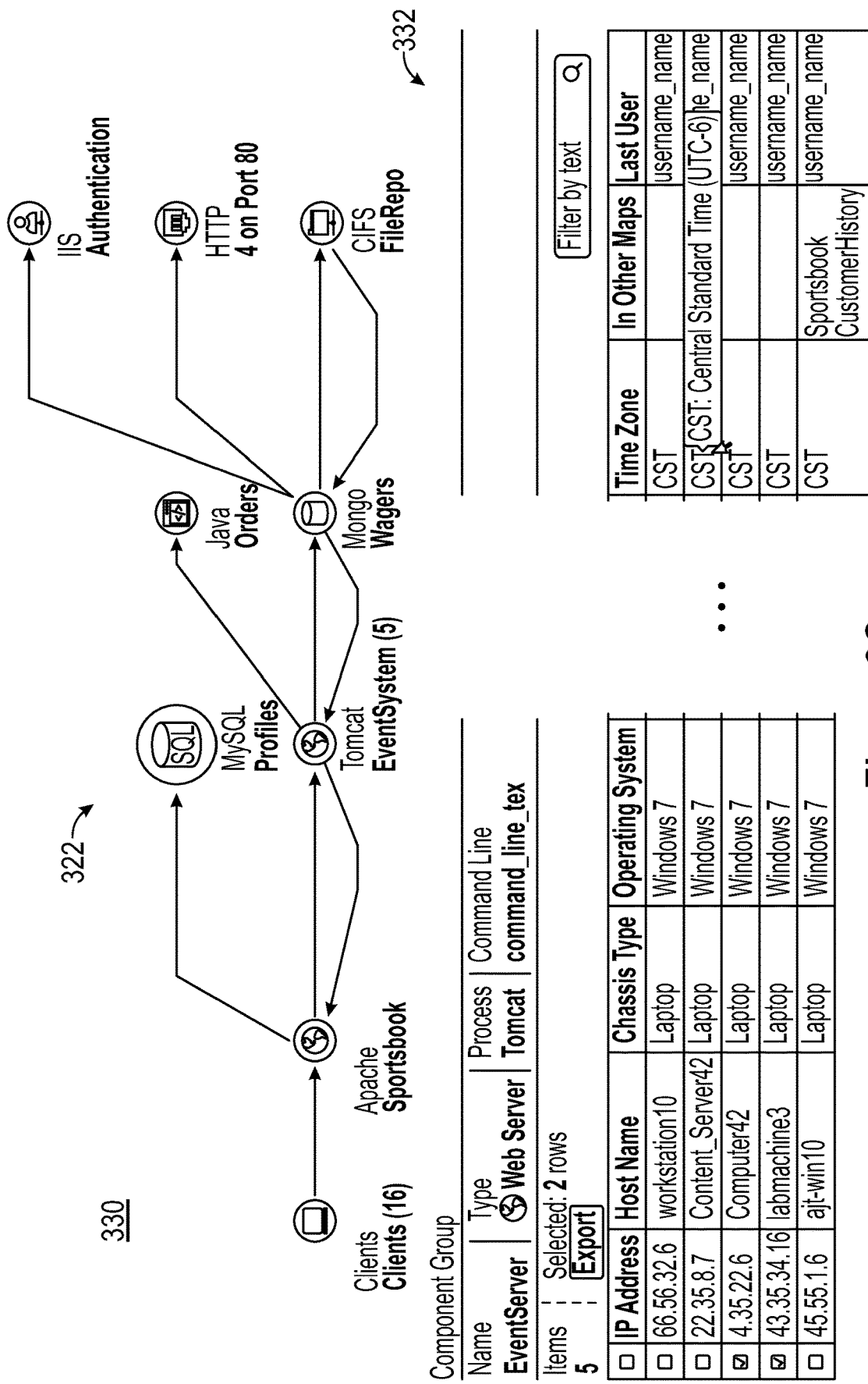

In some embodiments, when a user selects the EventSystem coalesced component in the user interface 320 of FIG. 3B, the user interface 320 transitions to user interface 330 shown in FIG. 3C. In user interface 326, the EventSystem coalesced component is visually highlighted (e.g., visually distinguished from the other components in the application map 322), and the Application Components listing of FIG. 3B is replaced by a Component Group listing 332 in FIG. 3C. The Component Group listing 332 lists application components corresponding to the user-selected EventSystem coalesced component. In some embodiments, additional information regarding any respective component in application map 322, or in the Component Group listing 332, is accessed by user selection of the respective component in application map 322, or in the Component Group listing 332, and optionally specifying the additional information requested by the user (e.g., through the use of a pull-down menu that is activated when the application component is selected by the user).

Figure 3D:
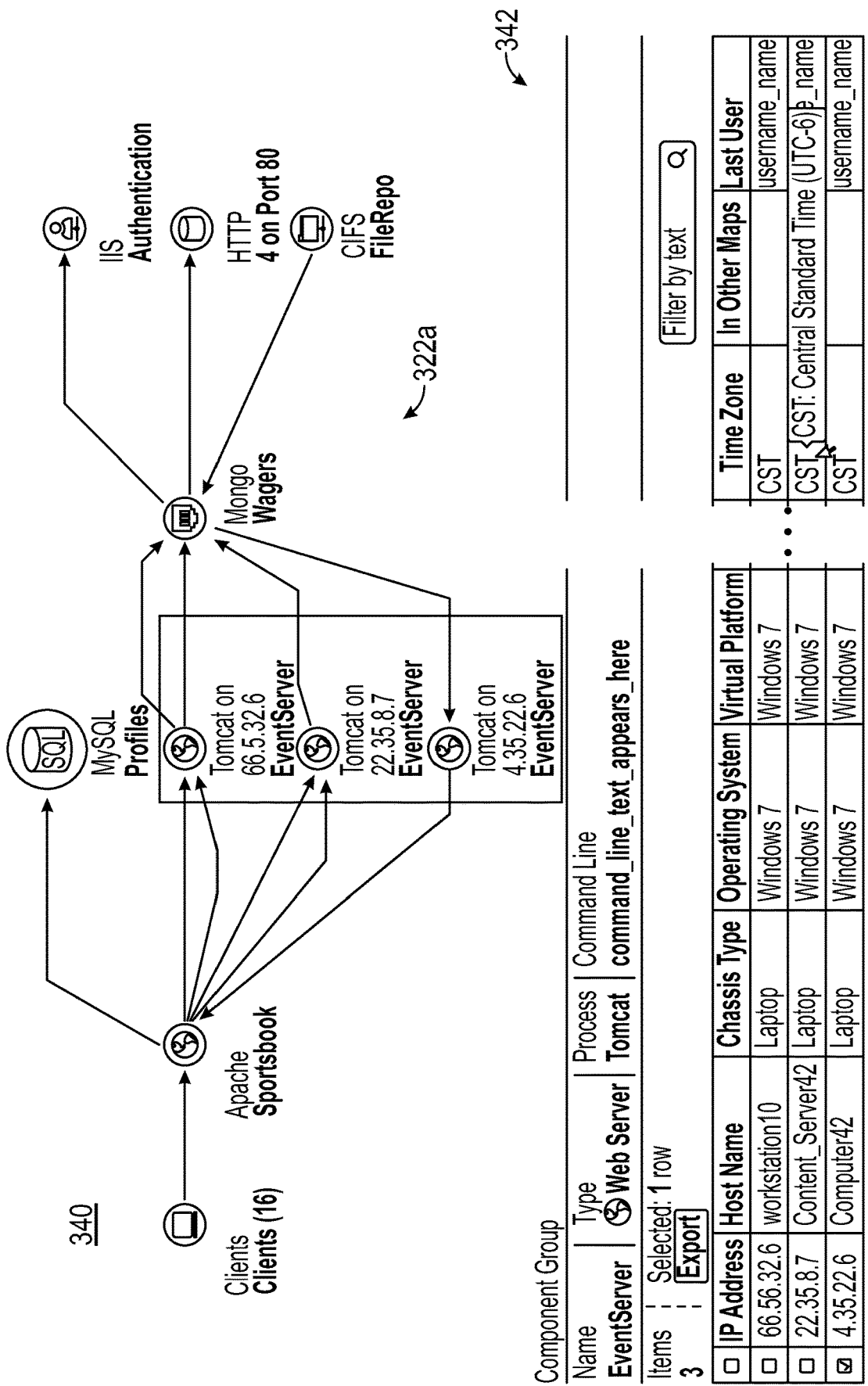

In some embodiments, when a user performs a predefined gesture (e.g., a double click, right click, or long press or double tap touch input) on the EventSystem coalesced component in the user interface 326 of FIG. 3C, the user interface 330 transitions to user interface 340 shown in FIG. 3D, including a modified representation 322a of the application map (herein called application map 322a for ease of reference). In user interface 340, the EventSystem coalesced component has been expanded, and thus replaced by representations of components corresponding to the EventSystem coalesced component. Due to limitations of space, only three of the five corresponding components are shown in FIG. 3D, but in some implementations, all corresponding components are shown when a coalesced component is expanded. In FIG. 3D, the Component Group listing 342 lists application components corresponding to the expanded set of Event-Server components shown in application map 322a. In some embodiments, additional information regarding any respective component in application map 322a, or in the Component Group listing 342, is accessed by user selection of the respective component in application map 322a, or in the Component Group listing 342, and optionally specifying the additional information requested by the user (e.g., through the use of a pull-down menu that is activated when the application component is selected by the user).

FIG. 4 depicts a flow chart of a method 400 for generating an application map of an application of a network (e.g., network 100 of FIG. 1A), in accordance with some embodiments. The application map maps distributed components of one or more respective applications, and the connectivity between the components of the applications. From the application dependency map, the distributed processing architecture of the respective applications is apparent, and optionally can be overlaid with additional data or other information, as discussed below, to make the application map even more useful. For example, components of the one or more respective applications include processes that are running on one or more machines of a network. Connectivity between the components of the applications include inter-process communications between processes running on the one or more machines of the network.

For brevity, method 400 is described below as being performed by a server system (server 108 of FIG. 1B) in a network (e.g., network 100 of FIG. 1A) comprising a plurality of machines located at (e.g., nodes in) one or more non-static collections of nodes (e.g., a non-static collection of nodes 102), where each non-static collection of nodes forms a linear communication orbit (e.g., linear communication orbit 106a, 106b or 106c of FIGS. 1A-1B). Thus, the plurality of machines may be located at nodes in one or more linear communication orbits. Typically, the server system is distinct from the plurality of machines in the one or more collections of nodes, and thus is not located in any of the linear communication orbits, but in some embodiments the server is located at a node in one of the linear communication orbits.

Method 400, as performed by a server system, is governed by instructions that are stored in a non-transitory computer readable storage medium and that are executed by one or more processors of the server system. The operations shown in FIG. 4 may correspond to instructions stored in a computer memory or non-transitory computer readable storage medium (e.g., memory 804 of machine 800 in FIG. 8). The computer readable storage medium may include a magnetic or optical disk storage device, solid-state storage devices such as Flash memory, or other non-volatile memory device or devices. The instructions stored on the computer readable storage medium may include one or more of: source code, assembly language code, object code, or another instruction format that is interpreted by one or more processors. Some operations in method 400 may be combined and/or the order of some operations may be changed.

In some embodiments, application mapping method 400 is performed (402) at a server system (e.g., server 108 or 110, FIGS. 1A, 1B, or server 800, FIG. 8) in a network (e.g., network 100, FIGS. 1A, 1B) comprising a plurality of machines (e.g., machines 102) located at one or more non-static collections of nodes, where each non-static collection of nodes forms a linear communication orbit (linear communication orbit 106a, 106b or 106c, FIGS. 1A, 1B). During the application mapping procedure, the server system obtains application mapping information from the plurality of machines and aggregates the obtained information to generate an application dependency map. For example, application mapping information can include machine identifiers (e.g., IP addresses of the machines hosting respective processes), process names, communication port numbers, process types, connectivity information concerning communications between processes, and so on. In some embodiments, the application map is saved as a tree structure with nodes in the tree representing respective processes of an application, and edges in the tree representing inter-process communications or communication channels between the processes. In some embodiments, the generated application map is a current application map snapshot. In some embodiments, the server system updates the application map according to a predetermined schedule to generate application map snapshots at each of the scheduled times. In some embodiments, the server system compares the current application map snapshot with one or more previously generated application map snapshots to identify changes in processes participating in the performance of the application mapped by the application map snapshots.

The server system initially generates (404) a first layer of application mapping information identifying one or more entities (e.g., processes running in machines of the linear communication orbit) including application entry points, where each application entry point is associated with a respective application. Each application entry point is a particular process in a particular machine, in the plurality of machines. The application mapping information identifying an application entry point typically includes information identifying a machine (e.g., a machine identifier, such as an IP address) of the plurality of machines in a linear communication orbit and a process (e.g., a process name or other identifier) that executes the entry point process for the respective application on the identified machine. The information identifying an application entry point optionally includes information identifying communication channels through which the application entry point communicates with other processes when executing the respective application. For example, in some embodiments, each such communication channel is identified by a machine identifier (e.g., the IP address of a machine) and port number (e.g., of an inbound port, also called listening port) on which a process at the identified machine receives communications transmitted through the communication channel.

The application entry point is considered to be the "first layer" of the application map for the respective application because it serves as the starting point to build the application map (e.g., the top node of the application map tree structure) for the respective application. In some embodiments, the application entry point is manually entered by a network administrator who possesses knowledge of the application to be mapped. In some embodiments, the application entry point is auto-generated by the server system by sending a query to machines in the linear communication orbit. For example, the server system can send a query, which includes information identifying an application, to machines (e.g., to application servers) in the linear communication orbit, and request the machines to return information identifying server processes associated with the identified application. In some embodiments, the application mapping procedure (method 400) simultaneously generates application maps for multiple respective applications. For example, the server system can generate multiple application entry points belonging to multiple applications, and then send queries to machines (e.g., application servers) in one or more linear communication orbits to locate other processes that participate in the execution of the applications having those application entry points. In some embodiments, the queries are sent only to machines that are application servers, as application entry points are generally located on application servers. By limiting the set of machines to which the queries are sent to application servers, the speed of the application discovery process is improved, and the process is made more efficient.

After generating the first layer of application mapping information (e.g., an application entry point), the server system initializes an application map with the first layer of application mapping information (406). As described above, the application map can be a tree structure (e.g., application map 300 of FIG. 3) and initializing the application map includes adding the application entry point as the starting node. In some embodiments, as part of the initialization, the server system identifies additional connections made by (e.g., outbound connections) or received by (e.g., inbound connections) the entities identified by the first layer of mapping information and generates a list of those connections (e.g., communication channels, or machine-port pairs) to be processed. For ease of explanation, in the following explanations, the list of connections is a list of outbound connections made by entities in the layer of the application map most recently added to the application map. Furthermore, in some embodiments, the list of connections to be processed is constrained to only include connections to entities located at application servers. In most implementations, application components are hosted (i.e., located) only on application servers, and limiting the list of connections to entities located at application servers makes the application mapping process more efficient than if connections to entities located at all endpoints were considered to be candidates for the mapping process.

After initializing the application map, the server system next performs a plurality of iterations of a predefined map gathering operation (408). Each iteration adds a new layer of application mapping information to the application map, unless the iteration does not identify any entities (e.g., processes) to add to the application map. For example, in some embodiments, each iteration of the predefined map gathering operation adds one or more nodes and one or more edges to the application map tree structure representing processes and inter-process communications between processes of the respective application. However, after a last iteration of the map gathering operation, which identifies processes to add to the application map, the procedure may terminate because either no new information is discovered, or no new communication channels are discovered. In the latter case, in some embodiments, the application mapping procedure detects and avoids cycles/loops in the application map by maintaining a visited list of previously processed components. In situations in which a last iteration of the map gathering operation identifies processes to add to the application map (e.g., in a last layer of the application map), but identifies no new communication channels to add to the application map, a layer of application mapping information is added to the application map, but the application map procedure nevertheless terminates because of the lack of new communication channels to process in a next iteration of the map gathering operation.

While the iterations of the predefined map gathering operation 408 described here implement a breadth-first search (BFS) tree traversal or search procedure, in some other embodiments, a depth-first tree traversal or search procedure is used to gather application mapping information. In some embodiments, the number of iterations of the predefined map gathering operation to be performed is defined by (e.g., limited by) a depth parameter received by the server system from a network administrator.

As part of the predefined map gathering operation 408, the server system sends one or more queries, sometimes called application mapping queries or application map information queries, to machines via one or more linear communication orbits (410). In some embodiments, the machines to which the queries are sent are limited to application servers, which makes the application mapping process much faster and more efficient than if the queries were sent to all machines on the one or more linear communication orbits. In some embodiments, the one or more queries include information identifying connections (e.g., the aforementioned list of connections) for which information is requested (sometimes herein called connections, or a list of connections, to be processed). The one or more queries optionally include filter criteria that specify a time period for which information regarding the listed connections is sought by the one or more queries. Alternatively, the one or more queries are queries requesting information regarding connections made or received during a predefined time period. While performing a respective iteration of the predefined map gathering operation, the information received in response to the one or more queries identifies entities having reciprocal connections, reciprocal to the connections identified by the list of connections included in the one or more queries, over which communications occurred during the predefined or specified time period, and identifies additional connections made or received by the identified entities distinct from the reciprocal connections.

After the server system sends the one or more queries to the machines via the one or more linear communication orbits, and receives the aforementioned information in response, the server system updates the list of connections to be processed by removing the connections included in the sent queries and adding newly identified additional connections, if any, identified by (or based on) the information received in response to the one or more queries. As a result, the list of connections to be processed is updated during each iteration of the map gathering operation, causing the removal of certain elements from the list, and potentially also the addition of elements to the list for further iterative processing. The list of connections to be processed is adaptive due to the iterative nature of the map gathering operation.

In some embodiments, the one or more queries include requests for information concerning inbound and/or outbound connections identified by the queries, or made by the entities (e.g., processes and/or machines) identified by the queries, and include filters specifying filtering criteria such as a number of connections, a frequency of connections, and/or a duration of connections with respect to the connections made by the entities included in the queries. In addition, in some embodiments, the filter criteria exclude connections to entities not located at application servers. These filters allow the application mapping procedure to target machines and processes that match a specific criterion. For example, application maps can be built based on connectivity information for a user-specified time interval, and can optionally exclude connections that occur with low frequency and connections to machines (e.g., machines that are not application servers) that are unlikely to be associated with components of multi-tier applications. Filtering allows the application mapping procedure to build the application map automatically using successive/iterative map-gathering operations, without pulling back an excessive amount of data to a central server. Alternatively, in some embodiments, the one or more queries include requests for information concerning inbound connections received by entities in either the first layer of the application map (if the current iteration of the predefined map gathering operation is the first such iteration) or in the layer most recently added to the application map, during a predefined or specified time period.

In some embodiments, the filters included in the queries further specify a computer group according to at least one machine characteristic (e.g., operating system, or the presence or absence of one or more particular applications or hardware elements, or a combination of such applications and hardware elements), and the information received in response to the one or more queries is received only from machines having the at least one machine characteristic. As a result, computers not in the computer group do not return data in response to the queries, and instead, just forward the queries to the next node in the linear communication orbit.

In some embodiments, in addition to generating the application map, the server system establishes a direct duplex connection between a specified machine in the linear communication orbit and the server system to directly send instructions to that machine. For example, the server system can first send a direct communication instruction to a specific (specified) machine via the linear communication orbit. In response to receiving the direct communication instruction, the specified machine sends an outbound connection request to the server system to establish the direct duplex connection between the machine and the server system. For example, the direct duplex connection can be a secure Web Socket connection. Refer to FIG. 1B and the related description on how a direct duplex connection can be set up with a machine in the linear communication orbit. The server system then downloads through the direct duplex connection local context data related to one or more operations performed by the specified machine while participating in the execution and resulting performance of a respective application mapped by the application map. For example, the local context data includes data (e.g., statistical information) concerning predefined communications between two processes hosted by the specified machine, or between a process hosted by the machine and process hosted by a different machine. In another example, the local context data identifies an executable file corresponding to one or more components of the application. In other examples, the local context data includes data concerning a file system at the specified machine, a registry at the specified machine, security events that occurred at the machine during a specified or predefined time period, or other events (e.g., machine or process performance-related events) that occurred at the machine during a specified or predefined time period.

In response to the one or more queries, the server system receives information identifying entities that have participated in predefined communications with entities identified in a most recently generated or added layer of application mapping information (412). Such information is generated by one or more machines which previously received the one or more queries via the linear communication orbit.

For example, at each machine of a first set of machines (e.g., machines which satisfy filter criteria, if any, specified by the one or more queries) in the plurality of machines, in response to receiving a respective query of the one or more queries sent by the server system, the machine identifies one or more locally executing processes corresponding to an entity or connection identified by the respective query (e.g., corresponding to any of the connections or entities identified by the respective query), and identifies predefined inter-process communications (e.g., outbound or inbound connections) by the identified process during a predefined or specified time period. The machine then sends to the server system application mapping information including information identifying or corresponding to the predefined communications by the one or more identified processes during the predefined time period.

In some examples, each machine in the first set of machines stores a local database with information (e.g., metadata) listing and/or identifying process connections, and searches that local database for connections that satisfy the respective query. Optionally, the local database stores information concerning inter-machine communications between processes running at the respective machine and processes running on other machines, as well as inter-process communications between pairs of processes running at the respective machine, and the application mapping information sent by the machine to the server system includes information identifying inter-machine communications, inter-process communications, or both.

In some embodiments, the application mapping information sent by a respective machine to the server system includes statistical information corresponding to the predefined communications (e.g., statistical information for respective communication channels) identified by the application mapping information. In some embodiments, the statistical information identified by the application mapping information includes information about the number, duration, and/or frequency of communications, and/or amount of information conveyed between the machines and a respective other machine. In some examples, the communications are predefined communications over a particular communication channel or connection.

In some embodiments, to facilitate application mapping, each machine of a first set of machines (in the aforementioned plurality of machines) monitors local events meeting one or more definitions, and stores metadata for the monitored events in a local metadata database, stored at the machine. For example, such monitoring and storage is performed by a background process. In response to a respective query, the machine extracts from the local database information identifying predefined communications, such as outbound communications, made by one or more processes executed by the machine during the predefined or specified time period, and sends, via the linear communication orbit to the server system, the information, extracted from the local metadata database, identifying predefined communications made by one or more processes executed by the machine the predefined or specified time period.

Method 400 further includes conditionally, in accordance with a determination that the received information includes one or more entities not already identified by the application map, adding a layer of application mapping information to the application map based on the received information (414). Typically, if the received information does not include any entities not already identified by the application map, the most recently added layer of application mapping information is the last layer that needs to be added, and no further iterations of the predefined map gathering operation are performed.

In some embodiments, the application map maps (416) distributed processing of one or more applications across the plurality of machines in the network. In some embodiments, the application map maps distributed components of one or more respective applications, the connectivity between the components (e.g., processes) of the one or more respective applications, the distributed processing architecture of the respective applications, and optionally includes information regarding the flow of data or information between the components of the applications.

When a last iteration of the predefined map gathering operation finishes, either due to a predefined iteration depth having been reached or because there are no more connections or entities to be added to the list of connections or entities to be processed, the server system provides (418), for presentation to a user, an interactive user interface including at least a portion of the application dependency map and one or more user-selectable processing options with respect to the application map or a respective machine or process participating in the performance of a respective application mapped by the application map. Examples of the interactive user interface are discussed above with reference to FIGS. 3B-3D. In some embodiments, there are one or more user-selectable processing options with respect to the application map, or with respect to a respective machine or process participating in the performance of a respective application mapped by the application map.

In some embodiments, after performing the plurality of iterations of the predefined map gathering operation, the server system identifies in the generated application map layers of entities participating in the performance of a respective application, and generates and prepares for display an application-specific map for the respective application. For example, the application-specific map includes the identified layers of entities participating in the performance of the respective application. In some embodiments, the server system identifies entities, in the generated application map layers of entities participating in the performance of a respective application, having the same or similar descriptors (e.g., names), or otherwise meeting predefined criteria (sometimes herein called predefined clustering criteria or predefine coalescing criteria) for being coalesced into a single logical entity in at last one representation of the application-specific map, herein sometimes called grouping by common names, where "common" means similar, overlapping or shared.

In some embodiments, the application map generated for one or more applications includes, for at least some of the components of the one or more applications, descriptors that are independent of the IP addresses and/or servers on which those components are located. It is noted that the server instances often change over time, and that the servers that host any particular application often change from time to time, and even from day to day. Furthermore, in some embodiments, components having descriptors that meet predefined clustering criteria are represented, in a first representation of the application map, as a single node or coalesced component, thereby making the application map more useful and easier to understand. In some embodiments, the user interface presenting the first representation of the application map (e.g., as shown in FIGS. 3B and 3C) is dynamic, and a user selection of, or predefined gesture on, the coalesced component causes the coalesced component to be expanded in a second representation of the application map (e.g., as shown by the transition from FIG. 3B to FIG. 3C), showing the underlying components included in the coalesced component.

In some embodiments, after generating an application map for a single, first application, the server system combines the application map for the first application, which can be called a first application map, with a different, second application map for a second application to produce a combined application map. In some embodiments, in conjunction with generating the combined application map, the server system identifies entities (e.g., processes) supporting more than one application, e.g., entities that are shared by the two applications. The entities supporting more than one application are entities in the first application map that overlap with entities in the second application map. Optionally, the server system identifies such shared entities in the combined application dependency map, for example by visually distinguishing them (e.g., by highlighting, distinct coloring, distinct fonts, etc.) them from other entities in the combined application map. FIG. 2 shows a combined application map for three applications.

In some embodiments, the one or more user-selectable processing options (sometimes called "further processing options") include a plurality of options for filtering the application dependency map. For example, if the user selects one or more options, the server system identifies portions of the application dependency map satisfying the user-selected options, and presents the identified portions (the portions satisfying the user-selected options) of the application dependency map. Examples of options for filtering the application dependency map includes options for selecting processes with port numbers in a specified range, options for selecting processes running on specified machines, and options for selecting connections having traffic meeting specified criteria (e.g., frequency, duration, amount of data conveyed, etc.)

In some embodiments, the one or more user-selectable processing options presented in the interactive user interface include one or more performance information options to select types of performance information (e.g., performance indicators) to present with respect to one or more machine or processes participating in the performance of a respective application mapped by the application map. In such embodiments, the method includes obtaining and presenting performance information (e.g., performance indicators) corresponding to user selected types of performance information for one or more user selected machines or processes, selected using the interactive user interface.

In some embodiments, the user-selectable processing options include options for comparing the generated application map with one or more other application maps, and presenting the comparison result (a comparison of the application map with the one or more other application maps.) to a user. For example, the options can allow the user to compare the generated application map with previously generated and stored application map snapshots so as to identify potential points of failure in the performance of a respective application mapped by the application map. In some embodiments, the comparison includes color coding or other mechanisms to emphasize or identify portions of the compared application maps that are different, or that are the same, or that overlap. While comparing arbitrarily different maps might be difficult, one tractable way to compare application maps is to align and compare the different layers of the maps. Another tractable way to compare two different application maps is to analyze their overlapping components and shared resources, and to visually indicate overlapping components and shared resources, or overlapping components and shared resources that meet predefined or specified criteria, in a combined application map. Such combined application maps can help an administrator detect that two or more applications share a component that is critical. As one example, a database server could be used by two different applications. Application maps can help identify bottlenecks in resources, for example by indicating the quantity of requests, or data, processed by respective processes, or by indicating the number of applications using the same resources. In the case of relocating or re-provisioning computer resources, the administrator can view application maps as a utility to gain visibility into business operations.

In some embodiments, the presented comparison result is configured to identify entities in the compared application dependency maps meeting predefined hot spot criteria. For example, the comparison result can obtain or identify statistical information corresponding to one or more entities in the application map that have workloads and/or resource allocations that satisfy criteria (e.g., predefined criteria, or user-specified criteria) associated with degradation of performance.

In some embodiments, the user-selectable processing options include one or more options for storing the application map as an application map snapshot, for comparison with other application map snapshots at a future time. In some embodiments, the application map snapshot includes information, for one or more machines, identifying processes participating in the performance of one or more applications. Such snapshots can be useful for planning shutdowns and responding to unplanned shutdowns (e.g., due to machine failures, power outages, etc.), because they include information identifying entities running on the one or more machines that need to be migrated to other machines or replaced by corresponding entities on other machines. If an endpoint computer is not or will not be operational, the administrator can use one or more application map snapshots to determine which applications would be affected critically.

In some embodiments, the one or more user-selectable processing options include options for viewing security and/or risk information overlaid on the application dependency map. Example security and risk information include missing patches, software vulnerabilities, presence of sensitive data, and so on.

In some embodiments, the server system is coupled to an administrator machine (e.g., administrator 116 of FIG. 1B). The server system and the administrator machine are both distinct from machines in the linear communication orbit, and the server system receives from the administrator machine instructions to perform the application mapping procedure and conveys the generated application map to the administrator machine. For example, the administrator machine can be operated by a network operator.

Figure 5:
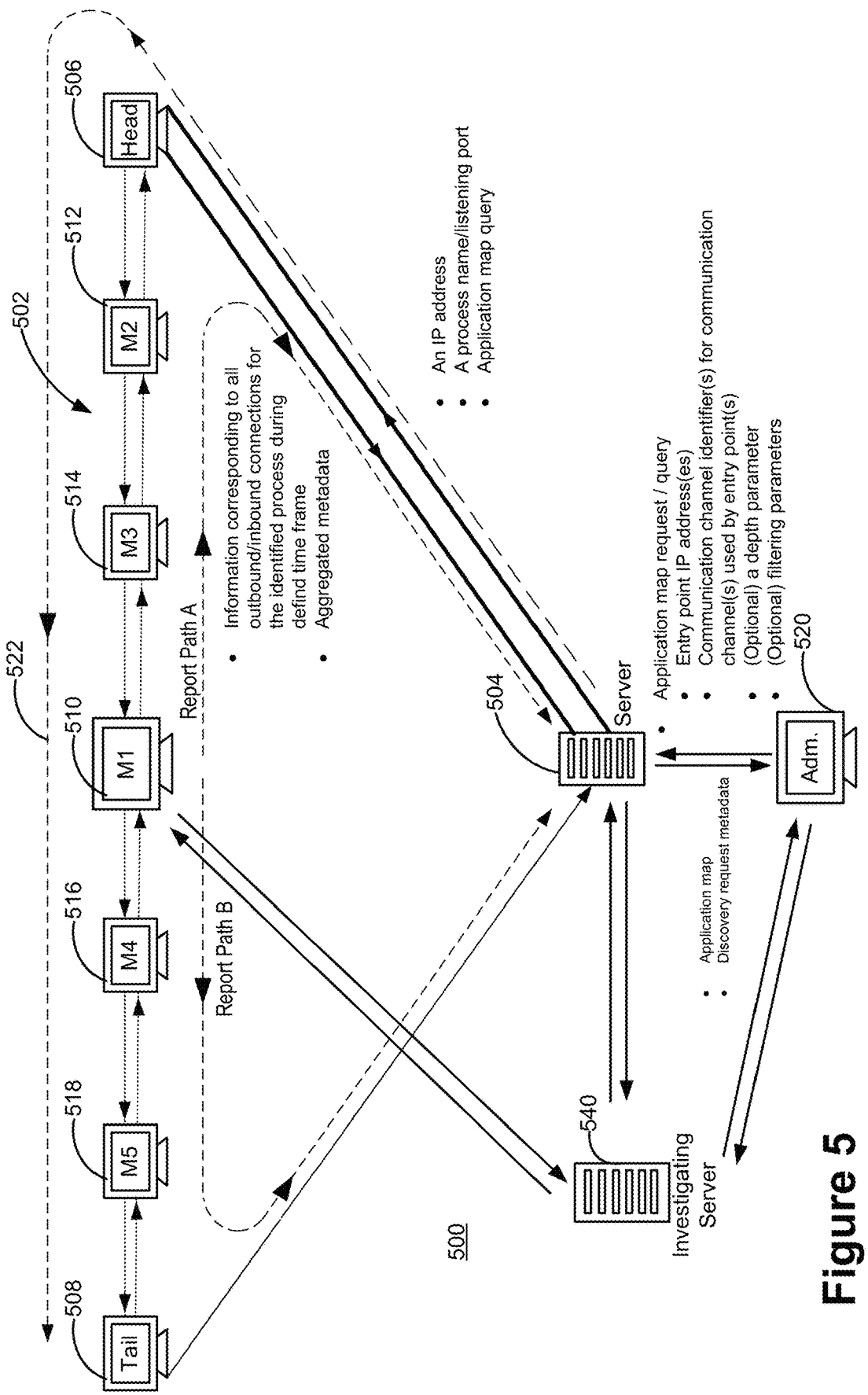
FIG. 5 illustrates a system that maps dependencies of multi-tier applications in a network that includes a plurality of machines located at nodes in a non-static collection of nodes that form a linear communication orbit, in accordance with some embodiments.

FIG. 5 illustrates an example of a system 500 (sometimes called a distributed system) that maps process dependencies of multi-tier applications in a network including a plurality of machines (e.g., 506 to 518) located at a non-static collection of nodes. An output produced by the mapping is sometimes called an application map or application dependency map, an example of which is shown in FIG. 2. In this example, the plurality of machines are all located in a linear communication orbit 502, but in other examples, the plurality of machines are all located in one or more linear communication orbits. Each machine of the plurality of machines has a respective machine identifier (e.g., IP address), and the plurality of machines have self-organized into an ordered sequence in accordance with a predefined order of the respective machine identifiers of the plurality of machines.

A multi-tier application, such as those described with respect to FIG. 2, includes multiple distinct processes that are executed by machines in the network. In some examples, two or more of the multiple processes included in, or used by, a multi-tier application are executed by a same machine in the plurality of machines in the network, while at least one other process included in or used by the application is executed by a different machine in the network. In other examples, all of the multiple processes used by the multi-tier application are executed by different machines in the network. In system 500, a server system 504 is coupled to linear communication orbit 502 at a head node 506. In addition to head node 506, linear communication orbit 502 further includes a tail node 508, which is optionally coupled to server 504, and a plurality of intermediate machines (e.g., machines M1-M5) 510-518 which are coupled between head node 506 and tail node 508. While intermediate machines 510-518 illustrate the configuration of linear communication orbit 502, in some embodiments, linear communication orbit 502 includes only one intermediate machine, while in other embodiments, it includes dozens, hundreds or even thousands of intermediate machines.

Server system 504, sometimes herein called server 504, obtains (e.g., from an administrator machine 520) or generates queries that it sends, via linear communication orbit 502, to two or more machines (e.g., machines located at a first subset of nodes) in linear communication orbit 502. Specifically, the server system 504 provides a query to head node 506, and the query then propagates from node to node along a command path 522, also herein called a request path, following linear communication orbit 502. The query is thereby provided to each of the two or more machines. Each of the two or more machines is configured to perform a set of operations locally according to the received query. For example, the query may request information identifying locally executed processes in communication with any process in a list of processes, or may request information identifying locally executed processes that send or receive information using any connection or communication channel in a list of connections or communication channels.

Each machine or node in linear communication orbit 502, other than the machine at tail node 508, that receives the query passes (e.g., transmits or forwards) the query to the next downstream machine on the linear communication orbit 502. Alternatively, in some embodiments, a node or machine may conditionally forgo passing the query to a next node or machine along the linear communication orbit 502. For example, in some embodiments, the node or machine determines, based on filter criteria included with the query, whether it is the last node in the linear communication orbit 502 to which the query is being sent or to which the query is applicable, and in accordance with a determination that it is the last such node or machine, the node or machine forgoes passing the query along the linear communication orbit 502 to a next downstream machine. Stated another way, in some embodiments, if a computational machine at a respective node (e.g., computational machine (M1) 510) determines that it is the last one of the machines that need to receive the query, that computational machine forgoes passing the query along the linear communication orbit 502.

Application dependency mapping, also called application mapping or multi-tier application mapping, is an iterative procedure, with results returned from one iteration of the procedure used to generate the information included in the one or more queries used to collect information in the next iteration of the procedure. The results returned from each iteration of the procedure are also used to add a layer of application mapping information to the application map being generated, unless the iteration fails to identify any new entities or communication channels to add to the application map. Each iteration of the procedure is sometimes herein called a predefined map gathering operation.

A preliminary step, prior to performing the iterative procedure, is to identify an application entry point for each of the applications for which an application map is to be generated. Application entry points may be identified manually, e.g., by an administrator or the like, or by sending an initial query through the linear communication orbit 502, to the machines or a subset of the machines on the linear communication orbit 502, to search for and identify processes that receive requests that meet predefined criteria associated with application entry points (e.g., requests using protocols or ports associated with application entry points).

The iterative procedure for identifying processes used by or included in a respective multi-tier application is described above with reference to FIG. 4. Some additional aspects are described here. Each iteration of the procedure includes sending a query through the linear communication orbit 502 (e.g., along request path 522) to machines along the linear communication orbit 502. In some embodiments, each iteration is implemented using two queries. A first query, which specifies the information being sought, is sent by server system 504 and delivered via the linear communication orbit 502 to all applicable machines on the linear communication orbit, and is processed in parallel by the applicable machines to produce at each such machine the requested information, which is locally buffered (e.g., in mapping database 628, FIG. 6). However, since producing the requested information may take a respective machine as long as a few seconds (e.g., 0.1 to 5 seconds), and the linear communication orbit can potentially have thousands of machines, the requested information is not immediately sent to the server system 504. Instead, after a delay (e.g., a delay of between 1 and 15 seconds) from sending the first query, a second query for collecting the requested information is sent by server 504 and delivered via the linear communication orbit 502 to all applicable machines on the linear communication orbit. As the second query reaches each machine on the linear communication orbit, the requested information, if any, is added to a payload portion of the second query. When the second query reaches tail node 508, or another predefined termination condition is detected, the second query or its payload portion is returned to server 504.

However, in some other embodiments, a single query is used for each iteration, with each machine along the linear communication orbit 502 processing the query upon receipt, adding to the payload portion of the query the requested information, if any, and then forwarding the query to a next machine, if any, on the linear communication orbit. When the query reaches tail node 508, or another predefined termination condition is detected, the query or its payload portion is returned to server 504.

In yet some other embodiments, a single query is used for each iteration, with server system 504 sending the query through the linear communication orbit 502, along the request path 522, to the machines in the linear communication orbit 502, with the machines along the linear communication orbit 502 processing the query in parallel, and each machine buffering the requested information it finds or produces, if any. When the query reaches a last applicable machine or node, such as tail node 508 of the linear communication orbit, the last machine adds the requested information, if any, it has found or produced to the payload portion of the query. The query then traverses the linear communication orbit 502 in the opposite direction as before, e.g., along report path A, with each machine that has any requested information to report adding the requested information to the payload portion of the query. In some embodiments, adding the requested information to the payload portion of the query is achieved by combining the requested information with information previously added to the payload portion of the query by another machine. When the query reaches the head node 506, the machine at head node 506 returns the query or its payload portion to the server system 504.

As described above with reference to FIG. 4, the information returned in response to the one or more queries sent during a respective iteration of the iterative procedure is used to determine if any further iterations of the iterative procedure are needed, and if any further iterations are needed, the information returned in response to the one or more queries sent during the respective iteration of the iterative procedure is used to generate the one or more queries sent during the next iteration.

In some embodiments, the server system 504 is coupled to an administrator machine 520. The server system 504 receives from the administrator machine an instruction to generate an application map for applications implemented, at least in part, using processes hosted by machines in linear communication orbit 502. The instruction optionally includes information identify one or more application entry points, or the IP addresses of one or more machines thought to include one or more application entry points. In some embodiments, the instruction optionally includes a depth parameter to limit the number of iterations of the predefined map gathering operation that are performed, and optionally includes filtering parameters to specify or limit the set of machines searched for relevant information, or filtering parameters limiting the communications to be considered when searching for processes that should be considered to be part of a multi-tier application. For example, the instruction may include node filter criteria specifying a list of machines or specifying machine characteristics satisfied by only a subset of the nodes (e.g., a first subset) in the linear communication orbit 502. In some embodiments, the instruction may also include process filter criteria specifying process characteristics satisfied by only a subset of processes running on nodes in the linear communication orbit 502. For example, the process filter criteria can include traffic criteria (e.g., frequency, duration, amount of data conveyed, or the like), process names, process port number ranges, and so on. In some embodiments, the filter criteria correspond to a list of machines selected individually by a user on the administrator machine 520. In some embodiments, the first subset of nodes is selected on the administrator machine 520 based on node selection criteria (e.g., whether the respective node executes a specified operating system, or whether the respective node is configured to comply with a particular security requirement). For example, a user can select all nodes of linear communication 502 that run a specific operating system as the first subset of nodes. The user may optionally add or exclude a subset of the nodes running the specific operating system from the first subset of nodes.

Optionally, administrator machine 520 is coupled to server system 504, but does not belong to linear communication orbit 502 on which the application is deployed. Optionally, administrator machine 520 is integrated within server system 504. Optionally, administrator machine 520 is one of the machines on linear communication orbit 502 and is configured to function as an administrator to control the generation of an application map for one or more multi-tier applications, using information collected from machines at nodes on linear communication orbit 502.

As described above with reference to method 400, the computational machine (e.g., computational machine (M1) 510) at a respective node of linear communication orbit 502 identifies processes that are hosted locally at the respective node in real-time while the events are occurring, including a plurality of events that are consistent with an application definition received by the respective node. Local processing of events by the computation machine at a respective node of linear communication orbit 502, as well as the processing of application definitions received by the computational machine and processing of map requests received by the computational machine, is described in more detail above, with reference to FIGS. 4.

In some embodiments, server system 504, administrative machine 520 or investigative server 540 periodically initiates execution of the application mapping procedure (e.g., method 400) according to a predetermined schedule (e.g., a regular interval of every 30 minutes, every hour, or at a set of predefined times in each day, week or month). Alternatively, or in addition, in some embodiments, server system 504, administrative machine 520 or investigative server 540 initiates execution of the application mapping procedure upon receiving a user request entered from administrator machine 520.

After receiving an application mapping query through linear communication orbit 502, the computational machine (e.g., M1 510) at the respective node of linear communication orbit 502 identifies information responsive to the query and returns the response to server system 504 through linear communication orbit 502. In some embodiments, the computational machine responds to the application mapping query with information (e.g., metadata, or a summary of metadata) extracted from a local database in which event information is stored.

For example, computational machine (M1) 510 receives the application dependency map discovery request from server system 504 via head node 506, and sends the identified subset or analysis of the process information to server system 504 along a report path A or a report path B. Report path A extends to remote server 504 via head node 506 and has a direction that is opposite to the direction of command path 522 along which the application mapping query is passed along linear communication orbit 502. Report path B extends to server system 504 via tail node 508 and has a direction that is the same as the direction of command path 522.

In some embodiments, when the response generated by computational machine (M1) 510 passes an intermediate machine (e.g., computational machine (M2) 512) on report path A or B, the response generated by the intermediate machine is combined with the response generated by a computational machine located upstream on the corresponding report path to produce aggregated information (also called a response message). In some embodiments, the aggregated information or response message includes responses produced by two or more machines and is sent to server system 504 along the report path. Further information regarding response generation and return is provided by the Incorporated Disclosure, with the request and response messaging described therein adapted herein for use with application mapping queries and application map information gathering.

Figure 6:
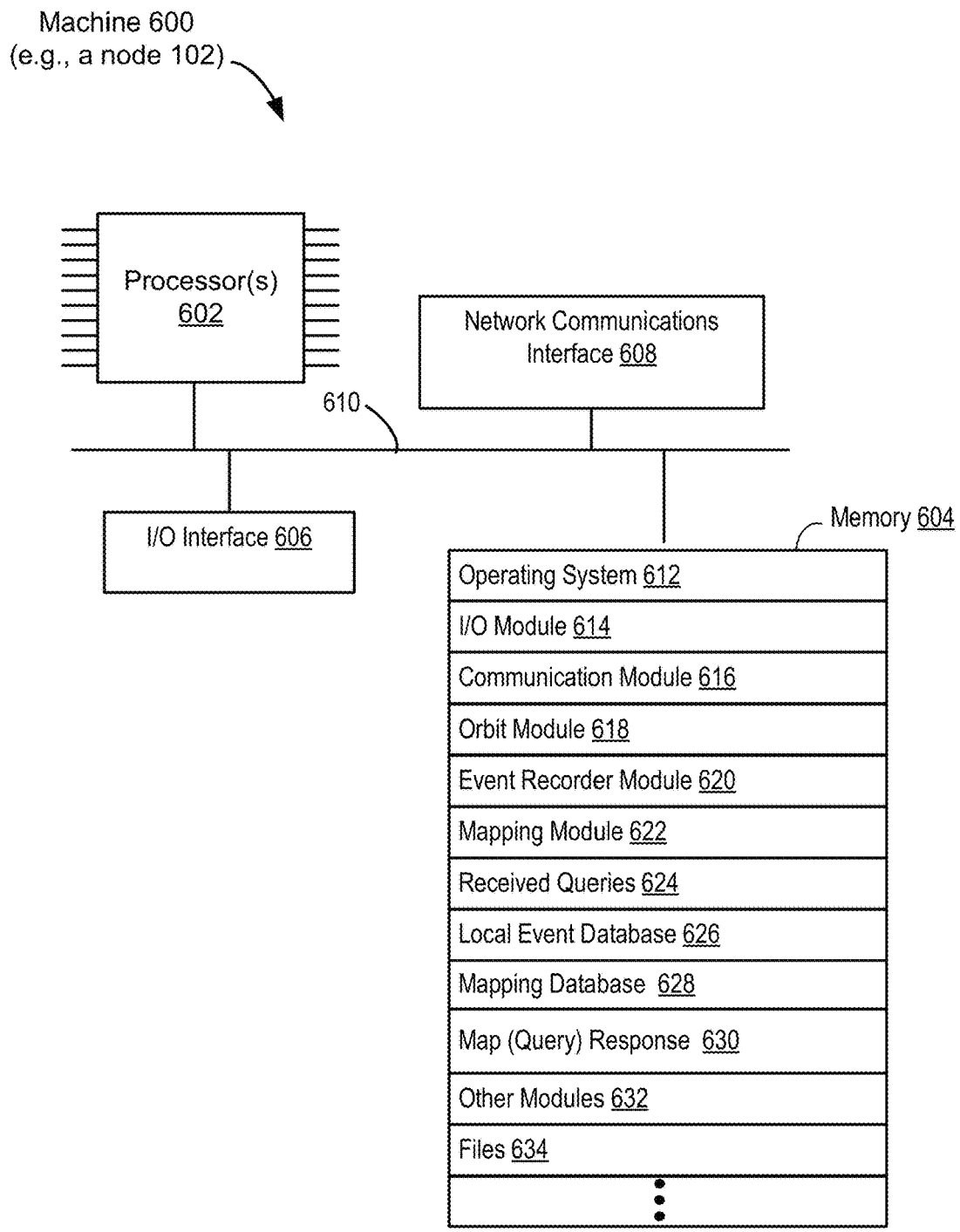
FIG. 6 is a block diagram of a system (e.g., an endpoint machine) in accordance with some embodiments.

FIG. 6 is a block diagram of an example machine 600, sometimes called an endpoint machine (e.g., serving as a node 102 shown in FIGS. 1A-1B, or any of machines 506-516 in FIG. 5). In some implementations, machine 600 includes one or more processors 602, memory 604 for storing programs and instructions for execution by one or more processors 602, one or more communications interfaces such as input/output interface 606 and network interface 608, and one or more communications buses 610 for interconnecting these components.

In some embodiments, input/output interface 606 includes a display and input devices such as a keyboard, a mouse or a track-pad. In some embodiments, communication buses 610 include circuitry (sometimes called a chipset) that interconnects and controls communications between system components. In some embodiments, memory 604 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 604 includes one or more storage devices remotely located from the one or more processors 602. In some embodiments, memory 604, or alternatively the non-volatile memory device(s) within memory 604, comprises a non-transitory computer readable storage medium.

Figure 7:
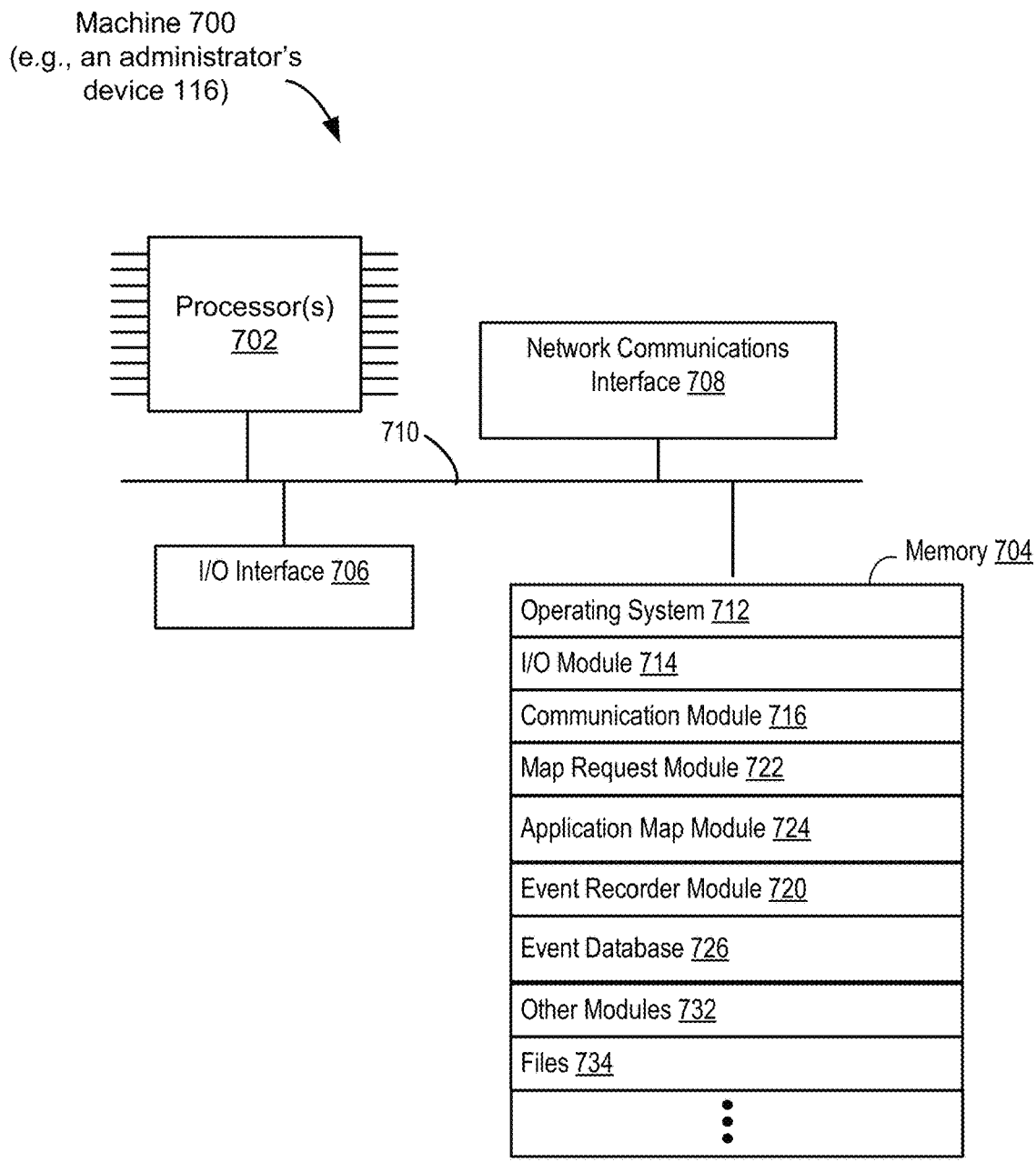
FIG. 7 is a block diagram of a system (e.g., an administrator's device) in accordance with some embodiments.

In some embodiments, memory 604 or alternatively the non-transitory computer readable storage medium of memory 604 stores the following programs, modules and data structures, instructions, or a subset thereof:

- Operating System 612 that includes procedures for handling various basic system services and for performing hardware dependent tasks.
- I/O module 614 that includes procedures for handling various basic input and output functions through one or more input and output devices.
- Communication module 616 that is used for connecting machine 600 to other machines (e.g., other machines 102 in network 100), administrator's machine 116 (e.g., a computer system or computer implemented device, as discussed below with reference to FIG. 7), servers (e.g., server 108/110) via one or more network communication interfaces 608 (wired or wireless) and one or more communication networks, such as the Internet, other wide area networks, local area networks, metropolitan area networks, and so on.
- Orbit formation and maintenance module 618 that includes instructions to self-insert machine 600 into a linear communication orbit and self-healing from a broken link in the linear communication orbit, as described in more detail in the Incorporated Disclosure.
- Event recorder module 620, which includes instructions for storing, in local event database 626, metadata representing locally performed operations and/or local events meeting predefined definitions, such as data communications with other nodes, formation and termination of data connections, file events (e.g., formation, opening, closing, data storage events, file metadata modifications, etc.), application events (installation, specific types of application execution events, etc.). In some embodiments, the event recorder module 620 also records system events (e.g., kernel events) in addition to application level events. Event recorder module 620 populates local event database 626 in accordance with one or more definitions. The event recorder module 620 is a process independent of operations of the mapping module 622.
- Mapping module 622, which extracts metadata from the local event database 626 in accordance with one or more received queries. In some embodiments, the mapping module 622 extracts metadata from the local event database 626 in accordance with the received query and stores the extracted metadata in the mapping database 628 at predefined intervals, such as one hour intervals.

For example, the mapping module 622 may be an agent process that is triggered periodically according to a predefined schedule. In some embodiments, mapping module 622 is triggered in response to commands received from a server system. In some embodiments, the mapping module 622, in addition to extracting metadata corresponding to one or more received queries, generates a summary of the events between a respective process, (e.g., a process executing on machine 600) and each distinct entity (e.g., the entity corresponding to an IP address and a port used to communicate with the respective process) for which there were communications that satisfy any of the one or more received queries. For example, the summary includes information such as number of events, average duration of each event, etc., and stores a single event summary record in the mapping database for each distinct entity with which the respective process interacted during the time period for which the summary record is generated.

Received queries 624 is a local database or cache in which queries received by machine 600 (e.g., from a server system of administrator's system) are locally stored.

Local event database 626 is a local database populated by event recorder module 620, as described above. In some embodiments, the local event database has a predefined or user-specified maximum size, such as 1 GB. The local event database 626 typically stores events for at least 7 days (e.g., at least the 7-day period preceding the current time), and in some implementations stores events for at least 14 days (e.g., at least the 14 day-period preceding the current time).

Mapping database 628 is a local database populated by mapping module 622. In some embodiments, mapping database 628 stores a subset of the metadata stored in the local event database 626. In some embodiments, mapping database 626 stores a plurality of summary records, each summary record storing information representing a summary of events (e.g., events represented by records in the local event database 626) satisfying a received query for a predefined period of time (e.g., information indicating a count of such events, information representing an average duration of such events). Typically, each summary record (if any such records are included in mapping database 628) is generated for a particular time period, in a sequence of time periods (e.g., hour-long time periods), and represents a summary of events for that time period (e.g., a summary of events meeting a specific application definition, performed by or at machine 600).

Map response module 630 which includes instructions for generating responses to queries (sometimes called application map information queries) received by machine 600. Map response module 630 retrieves event metadata from mapping database 628 in accordance with a respective query, generates a response based on the retrieved event metadata, and sends the response to a server system (e.g., the server system which sent the map request) via a linear communication orbit (e.g., in the payload portion of a query).

Other modules and applications 632 that include instructions for handling a variety of functions, such as responding to queries other than map requests, as well as other functions of machine 600.

Files 634, optionally including files having executable programs, image files containing images, and/or data files containing data of various types.

FIG. 6 is merely illustrative of the structures of a respective machine 600, which may be any of the machines at nodes 102 of a network (nodes 102 in FIGS. 1A and 1B). A person skilled in the art would recognize that particular embodiments of machines 600 may include more or fewer components than those shown. One or more modules described above may be divided into sub-modules, and/or one or more functions may be provided by different modules than those shown herein.

FIG. 7 is a block diagram of an exemplary machine 700 (e.g., serving as an administrator's machine 116 shown in FIG. 1B). In some implementations, machine 700 is a computer system or computer-implemented device that includes one or more processors 702, memory 704 for storing programs and instructions for execution by one or more processors 702, one or more communications interfaces such as input/output interface 706 and network interface 708, and one or more communications buses 710 for interconnecting these components.

In some embodiments, input/output interface 706 includes a display and input devices such as a keyboard, a mouse or a track-pad. In some embodiments, communication buses 710 include circuitry (sometimes called a chipset) that interconnects and controls communications between system components. In some embodiments, memory 704 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 704 includes one or more storage devices remotely located from the one or more processors 702. In some embodiments, memory 704, or alternatively the non-volatile memory device(s) within memory 704, comprises a non-transitory computer readable storage medium.

In some embodiments, memory 704 or alternatively the non-transitory computer readable storage medium of memory 704 stores the following programs, modules and data structures, instructions, or a subset thereof:

- Operating System 712 that includes procedures for handling various basic system services and for performing hardware dependent tasks.
- I/O module 714 that includes procedures for handling various basic input and output functions through one or more input and output devices.
- Communication module 716 that is used for connecting machine 700 to other machines (e.g., any of machines 102 in network 100) or servers (e.g., server 108, server 110) via one or more network communication interfaces 708 (wired or wireless) and one or more communication networks, such as the Internet, other wide area networks, local area networks, metropolitan area networks, and so on.
- Map request module 722, which includes instructions for sending queries, sometimes called application map information queries, via a server (e.g., server 108, FIGS. 1A, 1B, or server 504, FIG. 5), to various nodes in a network (e.g., network 100, FIGS. 1A and 1B), in response to user commands or periodically in accordance with a predefined schedule. Application map information queries are discussed in more detail elsewhere in this document. Map request module 722 optionally includes instructions for sending queries to identify application entry points.
- Application map module 724, which includes instructions for analyzing the information received in response to queries sent by map request module 722, and instructions for generating one or more application maps based on the information received in response to queries sent by map request module 722. Application map module 724 optionally includes instructions for providing for presentation to a user, an interactive user interface (e.g., examples of which are shown in FIGS. 3B-3D, described above) including at least a portion of an application map and one or more user-selectable processing options with respect to the application map or a respective machine or process participating in the performance of a respective application mapped by the application map. Application map module 724 or map request module 722 includes instructions for aggregating the information received in response to queries sent by map request module 722.

Event database 726 is a database populated with event information received from one or more machines in the distribute system (e.g., network 100). In some embodiments, event information in event database 726 is used when presenting one or more of the processing options described above with respect to operation 418 of method 400 (FIG. 4). In some embodiments, an administrator machine (e.g., machine 116 or 700) or server (e.g., server 108 or 800) sends queries, periodically or otherwise, to machines in network 100 to obtain information to be combined with, overlaid on, or used in conjunction with one or more application maps, and that information is stored in event database 726.

Other modules and applications 732 that include instructions for handling a variety of functions, such as responding to queries other than map requests, as well as other functions of machine 700.

Files 734, optionally including files having executable programs, image files containing images, and/or data files containing data of various types.

Machine 700 optionally includes an event recorder module 720 (e.g., similar to event recorder module 620 of machine 600), which includes instructions for storing, in a local event database, metadata representing locally performed operations and/or local events meeting predefined definitions, such as data communications with other nodes, formation and termination of data connections, file events (e.g., formation, opening, closing, data storage events, file metadata modifications, etc.), application events (installation, specific types of application execution events, etc.). Machine 700 also optionally includes a local event database (not shown), distinct from event database 726, to store such metadata.

FIG. 7 is merely illustrative of the structures of machines 700. A person skilled in the art would recognize that particular embodiments of machines 700 may include more or fewer components than those shown. One or more modules may be divided into sub-modules, and/or one or more functions may be provided by different modules than those shown.

Figure 8:
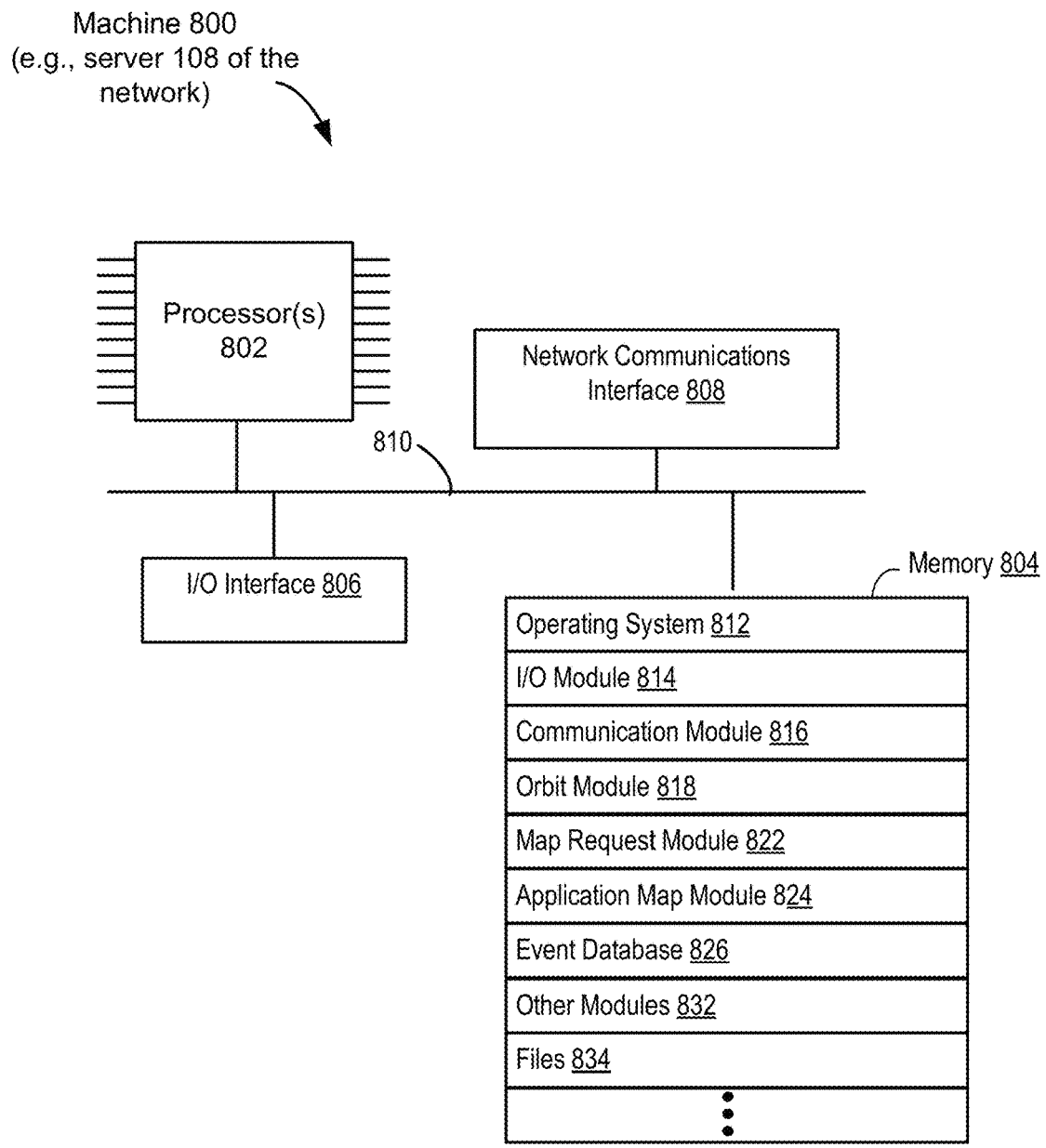
FIG. 8 is a block diagram of a system (e.g., a server of the network) in accordance with some embodiments.

FIG. 8 is a block diagram of an exemplary machine 800 (e.g., serving as a server 108 of the network shown in FIGS. 1A-1B). In some implementations, machine 800 includes one or more processors 802, memory 804 for storing programs and instructions for execution by one or more processors 802, one or more communications interfaces such as input/output interface 806 and network interface 808, and one or more communications buses 810 for interconnecting these components.

In some embodiments, input/output interface 806 includes a display and input devices such as a keyboard, a mouse or a track-pad. In some embodiments, communication buses 810 include circuitry (sometimes called a chipset) that interconnects and controls communications between system components. In some embodiments, memory 804 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 804 includes one or more storage devices remotely located from the one or more processors 802. In some embodiments, memory 804, or alternatively the non-volatile memory device(s) within memory 804, comprises a non-transitory computer readable storage medium.

In some embodiments, memory 804 or alternatively the non-transitory computer readable storage medium of memory 804 stores the following programs, modules and data structures, instructions, or a subset thereof:

Operating System 812 that includes procedures for handling various basic system services and for performing hardware dependent tasks.

I/O module 814 that includes procedures for handling various basic input and output functions through one or more input and output devices.

Communication module 816 that is used for connecting machine 800 to other machines (e.g., machines 102 in network 100, an administrator's device 116, etc.) or servers (e.g., remote server 110) via one or more network communication interfaces 808 (wired or wireless) and one or more communication networks, such as the Internet, other wide area networks, local area networks, metropolitan area networks, and so on.

Orbit formation and maintenance module 818 that includes instructions to provide endpoint machines with the information needed by those machines (e.g., the IP addresses of machines that are potential neighbors of those endpoint machines) to self-insert themselves into a linear communication orbit, as described in more detail in the Incorporated Disclosure.

Map request module 822, which includes instructions for sending queries, sometimes called application map information queries, via one or more linear communication orbits (e.g., LCOs 106a-106c, FIGS. 1A, 1B, or LCO 502, FIG. 5), to various nodes in a network (e.g., network 100, FIGS. 1A and 1B), in response to user commands or periodically in accordance with a predefined schedule. Application map information queries are discussed in more detail elsewhere in this document. Map request module 822 optionally includes instructions for sending queries to identify application entry points.

Application map module 824, which includes instructions for analyzing the information received in response to queries sent by map request module 822, and instructions for generating one or more application maps based on the information received in response to queries sent by map request module 822. Application map module 824 optionally includes instructions for providing for presentation to a user, an interactive user interface (e.g., examples of which are shown in FIGS. 3B-3D, described above) including at least a portion of an application map and one or more user-selectable processing options with respect to the application map or a respective machine or process participating in the performance of a respective application mapped by the application map. Application map module 824 or map request module 822 includes instructions for aggregating the information received in response to queries sent by map request module 822.

Event database 826 is a database populated with event information received from one or more machines in the distributes system (e.g., network 100). In some embodiments, event information in event database 826 is used when presenting one or more of the processing options described above with respect to operation 418 of method 400 (FIG. 4). In some embodiments, an administrator machine (e.g., machine 116 or 700) or server (e.g., server 108 or 800) sends queries, periodically or otherwise, to machines in network 100 to obtain information to be combined with, overlaid on, or used in conjunction with one or more application maps, and that information is stored in event database 826.

Other modules 832 that include instructions for handling a variety of functions, such as forwarding instructions, queries, requests from the administrator's device and/or the remote investigating server along the linear communication orbit, and forwarding responses and answers collected from the network to the administrator's device and/or the remote investigating server.

Files 834, optionally including files having executable programs, image files containing images, and/or data files containing data of various types.

FIG. 8 is merely illustrative of the structures of machines 800. A person skilled in the art would recognize that particular embodiments of machines 800 may include more or fewer components than those shown. One or more modules may be divided into sub-modules, and/or one or more functions may be provided by different modules than those shown.

Figure 9:
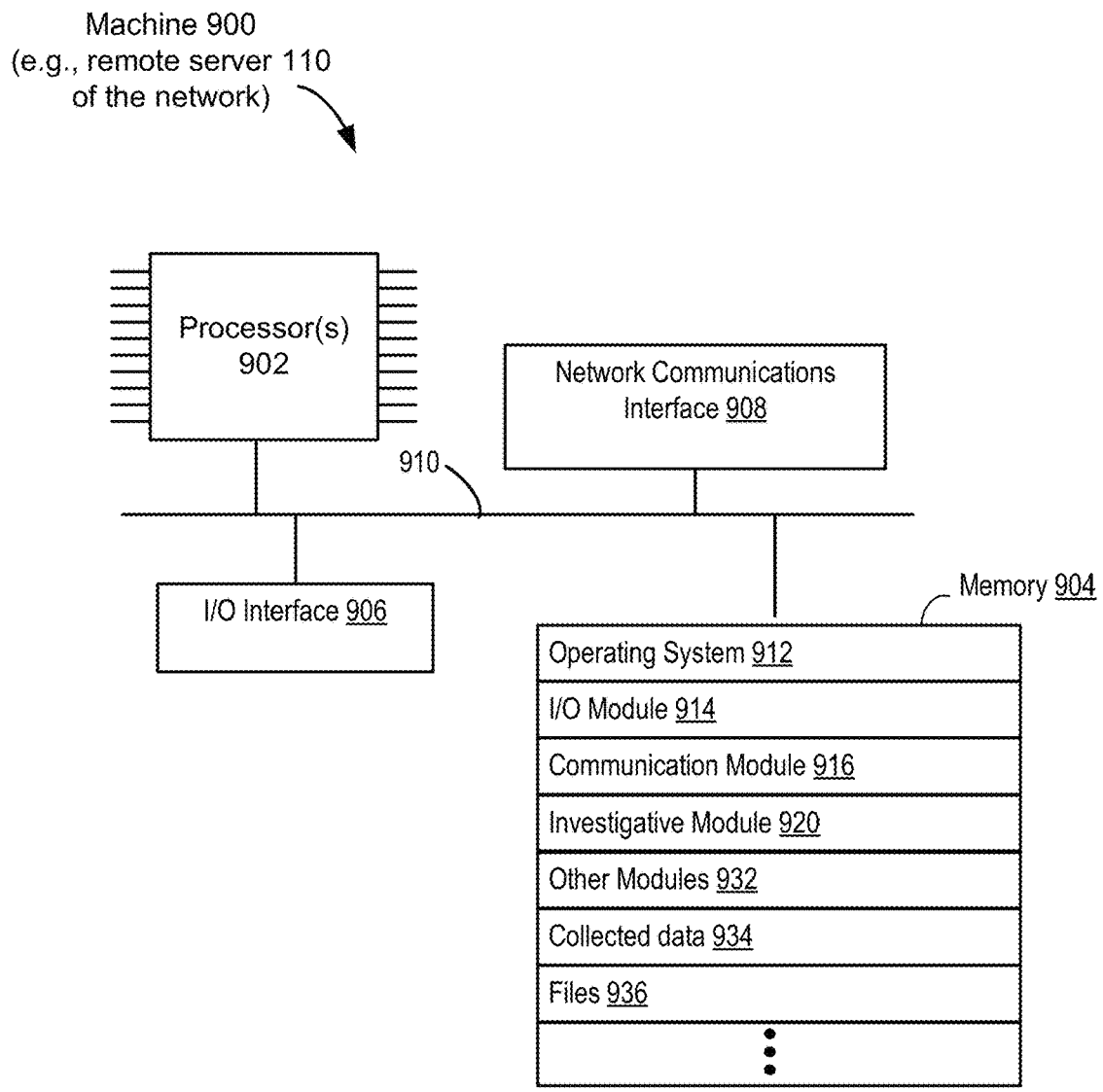
FIG. 9 is a block diagram of a system (e.g., a remote investigating server) in accordance with some embodiments.

FIG. 9 is a block diagram of an exemplary machine 900 (e.g., serving as a remote investigating server 110, sometimes herein called remote server 110, shown in FIG. 1B). In some implementations, machine 900 includes one or more processors 902, memory 904 for storing programs and instructions for execution by one or more processors 902, one or more communications interfaces such as input/output interface 906 and network interface 908, and one or more communications buses 910 for interconnecting these components.

In some embodiments, input/output interface 906 includes a display and input devices such as a keyboard, a mouse or a track-pad. In some embodiments, communication buses 910 include circuitry (sometimes called a chipset) that interconnects and controls communications between system components. In some embodiments, memory 904 includes high-speed random-access memory, such as DRAM, SRAM, DDR RAM or other random-access solid-state memory devices; and optionally includes non-volatile memory, such as one or more magnetic disk storage devices, optical disk storage devices, flash memory devices, or other non-volatile solid-state storage devices. In some embodiments, memory 904 includes one or more storage devices remotely located from the one or more processors 902. In some embodiments, memory 904, or alternatively the non-volatile memory device(s) within memory 904, comprises a non-transitory computer readable storage medium.

In some embodiments, memory 904 or alternatively the non-transitory computer readable storage medium of memory 904 stores the following programs, modules and data structures, instructions, or a subset thereof:

- Operating System 912 that includes procedures for handling various basic system services and for performing hardware dependent tasks.
- I/O module 914 that includes procedures for handling various basic input and output functions through one or more input and output devices.
- Communication module 916 that is used for connecting machine 900 to other machines (e.g., machines 102 in network 100, an administrator's device 116) or servers (e.g., server 108) via one or more network communication interfaces 908 (wired or wireless) and one or more communication networks, such as the Internet, other wide area networks, local area networks, metropolitan area networks, and so on.
- Investigative module 920 that includes instructions to: generate an instruction packet for a specified node on a linear communication orbit (e.g., node 102-f on linear communication orbit 106a, FIG. 1B) to initiate an outbound connection to the machine 900 (e.g., investigating server 110, FIG. 1B); send the instruction packet to the specified node through the linear communication orbit, establish a direct full duplex connection at the request of the node, communicate with the node through the direct full duplex connection (e.g., to obtain data from the node's local event database and/or mapping database); issue queries through one or more servers (e.g., server 108) to obtain information from other nodes in the linear communication orbit or elsewhere in the network, either through linear communication orbits in the network or by establishing additional direct full duplex connections with one or more other nodes; perform investigative tasks, including analyzing the collected data (e.g., event information relevant to specific application definitions; event information relevant to operations performed by the specified node and/or other nodes, etc.) and generating reports based on the analysis (e.g., application based maps, endpoint based maps, as well as other types of reports). The reports may include information relevant to determining what applications and other processes are being executed by the specified node and other nodes, and for generating additional and/or modified application definitions.
- Other modules 932 that include instructions for handling other functions and aspects described herein. Modules 922 optionally include some or all of the modules described above with respect to machine 800 that are used to obtain event information from nodes in the network, generate application maps based on the obtained event information, and optionally providing for presentation to a user, an interactive user interface including at least a portion of an application map and one or more user-selectable processing options with respect to the application map or a respective machine or process participating in the performance of a respective application mapped by the application map.
- Collected data 934 which is a local database that is optionally used to store raw and/or processed data collected by investigative module 920.
- Files 936, optionally including files having executable programs, image files containing images, and/or data files containing data of various types.

FIG. 9 is merely illustrative of the structures of machines 900. A person skilled in the art would recognize that particular embodiments of machines 900 may include more or fewer components than those shown. One or more modules may be divided into sub-modules, and/or one or more functions may be provided by different modules than those shown.

The process information collected from the mapping database of the computational machine enables the server to build a portion of a map (e.g., a layer of a tree representing the application dependency) based on responses to the application dependency map discovery request by the computation machine and at least one other machine in the network. Further details are provided above with respect to method 400 of FIG. 4.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of mapping applications executed by machines in a network, comprising:
    at a server system connected to the network, wherein the machines in the network comprise a plurality of endpoint machines distinct from the server system, performing an application mapping procedure comprising:
        initializing an application dependency map, including adding a first layer of application mapping information to the application dependency map, wherein the application dependency map identifies relationships among application components of one or more multi-tier applications;
        sending a first query to one or more of the endpoint machines;
        receiving, in response to the first query, information identifying application components that have participated in predefined communications with application components identified in an existing layer of application mapping information in the application dependency map;
        adding a second layer of application mapping information to the application dependency map, based at least in part on the information received in response to the first query;
        after adding the second layer of application mapping information to the application dependency map, sending a second query to one or more of the of the endpoint machines, the second query being based at least in part on the application dependency map.

2. The method of claim 1, wherein
    the plurality of endpoint machines in the network are located at respective nodes in one or more non-static collections of nodes, each non-static collection of nodes forming a linear communication orbit;
    the network includes one or more linear communication orbits; and
    sending the first query to one or more of the endpoint machines in the network comprises sending the first query via the one or more linear communication orbits.

3. The method of claim 1, wherein performing the application mapping procedure includes receiving, in response to the first query, information identifying application components of the one or more multi-tier applications that have participated in predefined communications with application components identified in a most recently generated or added layer of application mapping information in the application dependency map.

4. The method of claim 3, wherein performing the application mapping procedure further includes:
    receiving, in response to the second query, information identifying application components that have participated in predefined communications with application components identified in a most recently generated or added layer of application mapping information in the application dependency map; and
    updating the application dependency map by adding to the application dependency map, based on the information received in response to the second query, a third layer of application mapping information based on the information received in response to the second query.

5. The method of claim 4, wherein the application mapping procedure includes:
    after adding the third layer of application mapping information to the application dependency map, sending an additional query to one or more of the endpoint machines in the network;
    receiving, in response to the additional query, information identifying application components that have participated in predefined communications with application components identified in a most recently generated or added layer of application mapping information in the application dependency map; and
    conditionally, in accordance with a determination that the information received in response to the additional query includes information meeting predefined criteria, adding a layer of application mapping information to the application dependency map based on the information received in response to the additional query.

6. The method of claim 1, wherein the application dependency map maps distributed processing of one or more respective applications, across the plurality of endpoint machines in the network, and the application mapping procedure includes providing, for presentation to a user, an interactive user interface including a representation of at least a portion of the application dependency map and one or more user-selectable processing options with respect to the application dependency map or a respective machine or process participating in performance of a respective application, of the one or more respective applications, mapped by the application dependency map.

7. The method of claim 6, wherein the one or more user-selectable processing options include a plurality of options for filtering the application dependency map, and the method includes:
identifying portions of the application dependency map satisfying one or more user-selected options of the plurality of options for filtering the application dependency map; and
presenting a representation of the identified portions of the application dependency map satisfying the one or more user-selected options for filtering the application dependency map.

8. The method of claim 1, wherein application mapping procedure includes, after adding a respective layer of application mapping information to the application dependency map, determining, based on information received in response to a last query sent to the one or more endpoint machines, whether a further iteration of sending a query to one or more endpoint machines in the network is needed.

9. The method of claim 1, wherein the server system is coupled to an administrator machine, and the method includes receiving from the administrator machine an instruction to generate the application dependency map.

10. The method of claim 9, wherein the instruction to generate the application dependency map, received from the administrator machine, includes information identifying one or more application entry points or identifiers of one or more machines in the network that include application entry points.

11. The method of claim 1, including presenting, in conjunction with the application dependency map, security and/or risk information.

12. The method of claim 1, including presenting, in conjunction with the application dependency map, additional information overlaid on the application dependency map.

13. A server system for mapping applications executed by a plurality of endpoint machines, distinct from the server system, in a network, the server system comprising:
one or more processors; and
memory storing programs, the programs including instructions, which when executed by the one or more processors cause the server system to perform an application mapping procedure that obtains and aggregates application mapping information from the plurality of endpoint machines to generate an application dependency map, the application mapping procedure comprising:
initializing an application dependency map, including adding a first layer of application mapping information to the application dependency map, wherein the application dependency map identifies relationships among application components of one or more multi-tier applications;
sending a first query to one or more of the endpoint machines;
receiving, in response to the first query, information identifying application components that have participated in predefined communications with application components identified in an existing layer of application mapping information in the application dependency map;
adding a second layer of application mapping information to the application dependency map, based at least in part on the information received in response to the first query;
after adding the second layer of application mapping information to the application dependency map, sending a second query to one or more of the of the endpoint machines, the second query being based at least in part on the application dependency map.

14. The server system of claim 13, wherein
the plurality of endpoint machines in the network are located at respective nodes in one or more non-static collections of nodes, each non-static collection of nodes forming a linear communication orbit;
the network includes one or more linear communication orbits; and
sending the first query to one or more of the endpoint machines in the network comprises sending the first query via the one or more linear communication orbits.

15. A non-transitory computer readable storage medium storing programs configured for execution by a server system for mapping applications executed by a plurality of endpoint machines in a network, the programs comprising instructions for performing an application mapping procedure that includes:
initializing an application dependency map, including adding a first layer of application mapping information to the application dependency map, wherein the application dependency map identifies relationships among application components of one or more multi-tier applications;
sending a first query to one or more of the endpoint machines;
receiving, in response to the first query, information identifying application components that have participated in predefined communications with application components identified in an existing layer of application mapping information in the application dependency map;
adding a second layer of application mapping information to the application dependency map, based at least in part on the information received in response to the first query;
after adding the second layer of application mapping information to the application dependency map, sending a second query to one or more of the of the endpoint machines, the second query being based at least in part on the application dependency map.

16. The non-transitory computer readable storage medium of claim 15, wherein performing the application mapping procedure includes receiving, in response to the first query, information identifying application components of the one or more multi-tier applications that have participated in predefined communications with application components identified in a most recently generated or added layer of application mapping information in the application dependency map.

17. The non-transitory computer readable storage medium of claim 15, wherein performing the application mapping procedure further includes:
    receiving, in response to the second query, information identifying application components that have participated in predefined communications with application components identified in a most recently generated or added layer of application mapping information in the application dependency map; and
    updating the application dependency map by adding to the application dependency map, based on the information received in response to the second query, a third layer of application mapping information based on the information received in response to the second query.

18. The non-transitory computer readable storage medium of claim 17, wherein the application mapping procedure includes:
    after adding the third layer of application mapping information to the application dependency map, sending an additional query to one or more of the endpoint machines in the network;
    receiving, in response to the additional query, information identifying application components that have participated in predefined communications with application components identified in a most recently generated or added layer of application mapping information in the application dependency map; and
    conditionally, in accordance with a determination that the information received in response to the additional query includes information meeting predefined criteria, adding a layer of application mapping information to the application dependency map based on the information received in response to the additional query.

19. The non-transitory computer readable storage medium of claim 15, wherein the application dependency map maps distributed processing of one or more respective applications, across the plurality of endpoint machines in the network, and the application mapping procedure includes providing, for presentation to a user, an interactive user interface including a representation of at least a portion of the application dependency map and one or more user-selectable processing options with respect to the application dependency map or a respective machine or process participating in performance of a respective application, of the one or more respective applications, mapped by the application dependency map.

20. The non-transitory computer readable storage medium of claim 19, wherein the one or more user-selectable processing options include a plurality of options for filtering the application dependency map, and the programs include instructions for:
    identifying portions of the application dependency map satisfying one or more user-selected options of the plurality of options for filtering the application dependency map; and
    presenting a representation of the identified portions of the application dependency map satisfying the one or more user-selected options for filtering the application dependency map.

21. The non-transitory computer readable storage medium of claim 15, wherein application mapping procedure includes, after adding a respective layer of application mapping information to the application dependency map, determining, based on information received in response to a last query sent to the one or more endpoint machines, whether a further iteration of sending a query to one or more endpoint machines in the network is needed.

22. The non-transitory computer readable storage medium of claim 15, wherein the server system is coupled to an administrator machine, and the programs include instructions for receiving from the administrator machine an instruction to generate the application dependency map.

23. The non-transitory computer readable storage medium of claim 22, wherein the instruction to generate the application dependency map, received from the administrator machine, includes information identifying one or more application entry points or identifiers of one or more machines in the network that include application entry points.

24. The non-transitory computer readable storage medium of claim 15, wherein the programs include instructions for presenting, in conjunction with the application dependency map, security and/or risk information.

25. The non-transitory computer readable storage medium of claim 15, wherein one or more programs include instructions for presenting, in conjunction with the application dependency map, additional information overlaid on the application dependency map.

26. The non-transitory computer readable storage medium of claim 15, wherein
    the plurality of endpoint machines in the network are located at respective nodes in one or more non-static collections of nodes, each non-static collection of nodes forming a linear communication orbit;
    the network includes one or more linear communication orbits; and
    sending the first query to one or more of the endpoint machines in the network comprises sending the first query via the one or more linear communication orbits.

\* \* \* \* \*